United States Patent
Linde et al.

(10) Patent No.: US 9,531,501 B2
(45) Date of Patent: Dec. 27, 2016

(54) DATA TRANSFER BETWEEN ELECTRONIC DEVICES

(75) Inventors: Joakim Linde, Palo Alto, CA (US); Brian J. Tucker, San Jose, CA (US)

(73) Assignee: Apple Inc., Cupertino, CA (US)

(*) Notice: Subject to any disclaimer, the term of this patent is extended or adjusted under 35 U.S.C. 154(b) by 239 days.

(21) Appl. No.: 13/403,613

(22) Filed: Feb. 23, 2012

(65) Prior Publication Data

US 2013/0102251 A1  Apr. 25, 2013

Related U.S. Application Data

(60) Provisional application No. 61/551,372, filed on Oct. 25, 2011.

(51) Int. Cl.
| | |
|---|---|
| *H04L 1/08* | (2006.01) |
| *H04W 80/02* | (2009.01) |
| *H04W 84/18* | (2009.01) |
| *H04L 1/04* | (2006.01) |
| *H04L 1/18* | (2006.01) |

(52) U.S. Cl.
CPC . *H04L 1/04* (2013.01); *H04L 1/08* (2013.01); *H04L 1/189* (2013.01); *H04L 1/1887* (2013.01)

(58) Field of Classification Search
CPC . H04L 69/22; H04M 1/7253; H04M 1/72591; H04M 2250/02; H04W 80/02; H04W 84/18
USPC ......................................... 455/41.2; 370/311
See application file for complete search history.

(56) References Cited

U.S. PATENT DOCUMENTS

| | | | |
|---|---|---|---|
| 2002/0172162 A1 | 11/2002 | Goodings | |
| 2008/0248758 A1* | 10/2008 | Schedelbeck | H04L 1/1874 455/69 |
| 2010/0022189 A1* | 1/2010 | Coker | H04H 20/33 455/41.3 |
| 2010/0157791 A1 | 6/2010 | Casaccia | |
| 2010/0166209 A1 | 7/2010 | Dunn | |
| 2011/0022916 A1* | 1/2011 | Desai et al. | 714/748 |
| 2011/0165466 A1 | 7/2011 | Zhamu et al. | |

(Continued)

OTHER PUBLICATIONS

PCT International Search Report and Written Opinion of the International Searching Authority for PCT/US2012/057921 mailed Dec. 14, 2012.

*Primary Examiner* — Ping Hsieh
*Assistant Examiner* — Xin Jia
(74) *Attorney, Agent, or Firm* — Sterne, Kessler, Goldstein & Fox PLLC

(57) ABSTRACT

During operation in the described embodiments, a transmitting electronic device transmits a first data channel protocol data unit (PDU) with a payload containing data D to a receiving electronic device using a Bluetooth Low Energy (BTLE) interface in a sending window for the transmitting electronic device during a regular event, wherein transmitting the first data channel PDU during the regular event comprises using a first frequency to transmit the first data channel PDU. The transmitting electronic device then transmits a second data channel PDU with a payload containing the same data D to the receiving electronic device using the BTLE interface in a sending window for the transmitting electronic device during a corresponding retransmission event, wherein transmitting the second data channel PDU during the retransmission event comprises using a second frequency to transmit the second data channel PDU.

17 Claims, 12 Drawing Sheets

(56) References Cited

U.S. PATENT DOCUMENTS

| | | |
|---|---|---|
| 2011/0217967 A1* | 9/2011 | Cohen et al. ................. 455/418 |
| 2012/0196534 A1* | 8/2012 | Kasslin et al. ............... 455/41.2 |
| 2012/0328061 A1* | 12/2012 | Chow .......................... 375/354 |
| 2013/0040610 A1* | 2/2013 | Migicovsky et al. ..... 455/412.2 |
| 2013/0042291 A1* | 2/2013 | Kambhatla ........ H04N 21/4122 |
| | | 725/127 |

* cited by examiner

DATA TRANSFER BETWEEN ELECTRONIC DEVICES

RELATED APPLICATIONS

This application is a non-provisional application from, and hereby claims priority under 35 U.S.C. §120 to, U.S. provisional patent application No. 61/551,372, titled "Data Transfer using the Bluetooth Low Energy Standard," by inventors Joakim Linde and Brian J. Tucker, filed on 25 Oct. 2011, which is incorporated by reference.

BACKGROUND

Field

The described embodiments relate to electronic devices with network connections. More specifically, the described embodiments relate to electronic devices that transfer data using the Bluetooth Low Energy standard.

Related Art

Many modern electronic devices include a networking subsystem that is used to communicate with other electronic devices. For example, these electronic devices can include networking subsystem with a cellular network interface (UMTS, LTE, etc.), a Bluetooth interface, and/or a wireless network interface (e.g., a wireless network such as described in the Institute of Electrical and Electronics Engineers (IEEE) standards 802.11).

These electronic devices sometimes wirelessly communicate with electronic devices that have very restrictive power-consumption requirements. For example, low-power electronic devices such athletic heart rate monitors and other such devices can require that power consumption by the device be kept at very low levels to preserve battery life in the device. Because many of the currently-available standards for wirelessly communicating between devices consume too much power, the standards often cannot be used when communicating with these low-power devices. For example, one commonly-used standard used to wirelessly communicate between electronic devices is the Bluetooth Classic standard ("BTC"), which is described in the Core v. 4.0 Specification for the Bluetooth System from the Bluetooth Special Interest Group (SIG) of Kirkland, Wash.). However, BTC consumes too much power to be used for communicating with many devices with restrictive power-consumption requirements. The Bluetooth Specification also describes the Bluetooth Low Energy standard ("BTLE") that enables data transfer using significantly less power than BTC. The BTLE standard can be used to communicate with some of these lower-power devices without consuming too much power.

In describing BTLE, the Bluetooth Specification describes an event-based communication scheme for managing communications between devices. When using BTLE, the devices first agree, while establishing a BTLE network connection, on a schedule of events that occur at corresponding times. Then, while subsequently using the BTLE network connection, during each event, the devices are configured to send data to and receive data from the other device (if data is available to be sent/received). FIG. 1 presents a timeline diagram illustrating an example of the BTLE event-based communication scheme. More specifically, FIG. 1 presents two timelines, one for a first device, and the other for a second device. As can be seen in FIG. 1, the first device has a sending window that occurs first during a given event (e.g., E0 or E1), and the second device has a receiving window that occurs when the first device is in its sending window. In addition, the second device has a sending window that occurs during the event, and the first device has a corresponding receiving window. To ensure that the communications from one device can be received by the other device, the devices are configured to communicate at a given frequency during a corresponding event.

In BTLE systems, when a device successfully receives data, the device sends an acknowledge message to the other device to acknowledge the successful receipt of the data. For example, using the timelines in FIG. 1, during event E0, the first device could send data in its sending window, and the second device could receive the data. The second device then sends an acknowledge message in its own sending window. If the first device does not receive an acknowledge message (because, e.g., the data arrived at the second device corrupted in some way), the first device awaits its next sending window during the next event and resends the data at the same frequency. The first device continues to resend the data at each event, at the same frequency, until receiving an acknowledge message from the second device.

Because the devices can be subject to interference (e.g., between a device and other devices in the environment in which the device is located), data sent by a first device to a second device can arrive in a corrupted state. However, resending the data at the same frequency at the next event can again be unsuccessful because the devices may be subject to the same source of interference. This may result in a device repeatedly attempting to resend data and continuing to encounter the same interference. Because some data is "timely," and hence generally should arrive at a given time and in a given sequence with respect to prior and subsequent data, the repeated resending of data can result in suboptimal performance for the devices, which can lead to an undesirable user experience.

SUMMARY

The described embodiment include system for communicating between electronic devices. During operation in some embodiments, a transmitting electronic device transmits a first data channel protocol data unit (PDU) to a receiving electronic device using a Bluetooth Low Energy (BTLE) interface in a sending window for the transmitting electronic device during a regular event, wherein the first data channel PDU comprises a payload with data D, and wherein transmitting the first data channel PDU during the regular event comprises using a first frequency to transmit the first data channel PDU using the BTLE interface. The transmitting electronic device then transmits a second data channel PDU to the receiving electronic device using the BTLE interface in a sending window for the transmitting electronic device during a corresponding retransmission event, wherein the second data channel PDU comprises a payload with the same data D, and wherein transmitting the second data channel PDU during the retransmission event comprises using a second frequency to transmit the second data channel PDU using the BTLE interface.

In some embodiments, when transmitting the second data channel PDU during the retransmission event, the transmitting electronic device is configured to automatically transmit the second data channel PDU without receiving a request from the receiving electronic device to transmit the second data channel PDU.

In some embodiments, the transmitting electronic device is configured to receive a message from the receiving electronic device that indicates that the PDU was received successfully in a receiving window for the transmitting electronic device during at least one of the regular event or the retransmission event.

In some embodiments, the data D comprises audio data.

In some embodiments, the first frequency is a different frequency than the second frequency.

In some embodiments, the receiving electronic device is an assistive-listening device.

In some embodiments, prior to transmitting PDUs during the regular event and the retransmission event, the transmitting electronic device is configured to communicate with the receiving electronic device to configure a schedule of times at which the regular event and the retransmission events occur.

In addition, during operation in some embodiments, a receiving electronic device receives a first data channel PDU from a transmitting electronic device using a BTLE interface in a receiving window for the receiving electronic device during a regular event, wherein the first data channel PDU comprises a payload with data D, and wherein receiving the first data channel PDU during the regular event comprises using a first frequency to receive the first data channel PDU using the BTLE interface. The receiving electronic device is configured to determine if the first data channel PDU was received with the data D in a correct condition. When the first data channel PDU was not received with the data D in the correct condition, the receiving electronic device is configured to receive a second data channel PDU from the transmitting electronic device using the BTLE interface in a receiving window for the receiving electronic device during a corresponding retransmission event, wherein the second data channel PDU comprises a payload with the same data D, and wherein receiving the second data channel PDU during the retransmission event comprises using a second frequency to receive the second data channel PDU using the BTLE interface.

In some embodiments, the first data channel PDU was received with the data D in the correct condition, the receiving electronic device is configured to configure one or more portions of the BTLE interface in a low-power mode during at least the retransmission event. In the low-power mode, the second data channel PDU transmitted from the transmitting electronic device during the retransmission event is ignored and not received in the receiving electronic device.

In some embodiments, when the first data channel PDU and/or the second data channel PDU was received with the data D in the correct condition, the receiving electronic device is configured to transmit a third data channel PDU to the transmitting electronic device from the receiving electronic device using the BTLE interface in a sending window for the receiving electronic device during at least one of the regular event or the retransmission event, wherein the third data channel PDU comprises a payload with an acknowledgement message that acknowledges that the data D was in the correct condition.

In some embodiments, when determining if the first data channel PDU was received successfully, the receiving electronic device is configured to perform one or more operations to check if the data D transmitted by the transmitting electronic device in the payload of the first data channel PDU matches the data D received by the receiving electronic device in the payload of the first data channel PDU. In some embodiments, performing the one or more operations to check comprises comparing a computed cyclic redundancy check (ECC) value for the first data channel PDU with a CRC value in a field in the first data channel PDU.

BRIEF DESCRIPTION OF THE FIGURES

In the figures, like reference numerals refer to the same figure elements.

DETAILED DESCRIPTION

Figure 1:
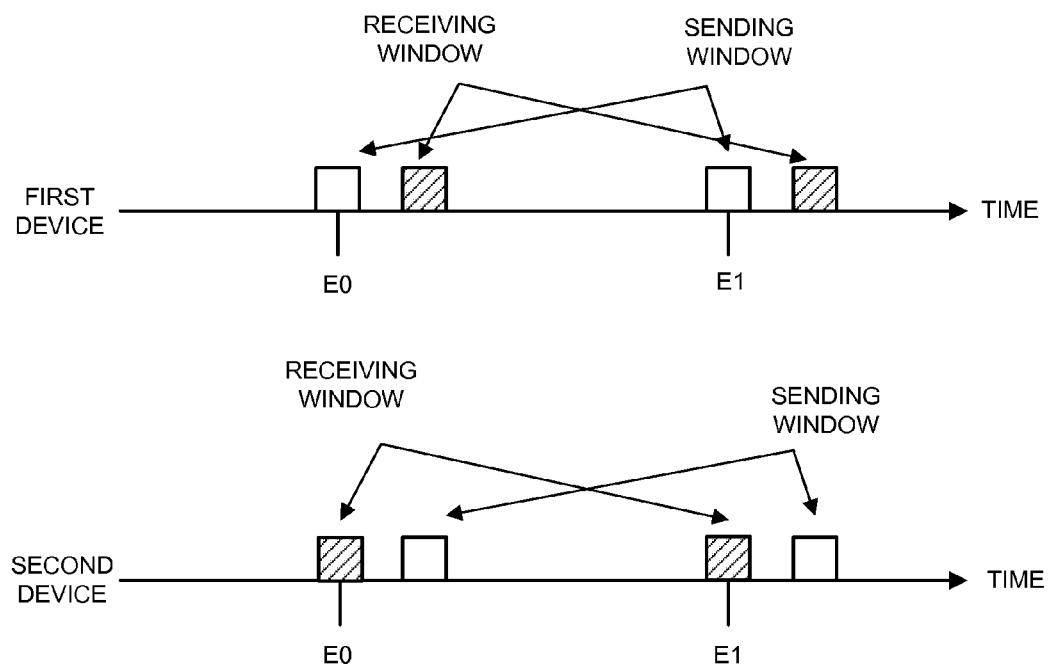
FIG. 1 presents an example of a BTLE event-based communication scheme.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description can be stored on a computer-readable storage medium. The computer-readable storage medium can include any device or medium (or combination of devices and/or mediums) that can store data structures and code for use by a computer system/electronic device. For example, the computer-readable storage medium can include volatile memory or non-volatile memory, including flash memory, random access memory (RAM, SRAM, DRAM, RDRAM, DDR/DDR2/DDR3 SDRAM, etc.), magnetic or optical storage mediums (e.g., disk drives, magnetic tape, CDs, DVDs), or other mediums capable of storing data structures or code. Note that in the described embodiments, the computer-readable storage medium does not include non-statutory computer-readable storage mediums such as transmission signals.

The methods and processes described in the following description can be embodied as program code that is stored in a computer-readable storage medium. When a computer system (see, e.g., electronic device 200 in FIG. 2 or assistive-listening device 300 in FIG. 3) reads and executes the program code stored on the computer-readable storage medium, the computer system performs the methods and processes in the program code stored in the computer-readable storage medium.

The methods and processes described in the following description can be included in hardware modules. For example, the hardware modules can include, but are not limited to, processors, application-specific integrated circuit (ASIC) chips, field-programmable gate arrays (FPGAs), and other programmable-logic devices. When the hardware modules are activated, the hardware modules perform the methods and processes included within the hardware modules. In some embodiments, the hardware modules include one or more general-purpose circuits that can be configured (e.g., by executing instructions) to perform the methods and processes. For example, in some embodiments, processing subsystem 202 (see FIG. 2) can acquire instructions from memory subsystem 204 and execute the instructions to cause processing subsystem 202 to perform the processes and operations in the described embodiments (the same is true for processing subsystem 302 and memory subsystem 304 in FIG. 3). In some embodiments, the instructions are firmware.

Overview

The described embodiments use a modified version of the Bluetooth Low Energy standard (herein referred to as "BTLE") to communicate between electronic devices. The existing BTLE standard is described in the Core v. 4.0 Specification for the Bluetooth System from the Bluetooth Special Interest Group (SIG) of Kirkland, Wash., which was published on 30 Jun. 2010. The Core v. 4.0 Specification for the Bluetooth System is hereby incorporated by reference to describe the aspects of the BTLE standard that are not herein described (and is hereinafter interchangeably referred to as "the BTLE specification").

The BTLE standard as described in the Bluetooth Specification does not include the capability to transfer and process audio data. However, the described embodiments comprise an improved version of the BTLE standard that enables the transfer and processing of audio data. The improved version of the BTLE standard in the described embodiments comprises: (1) an updated type of protocol data units ("PDUs" or "messages"); (2) a modified version of the BTLE protocol stack; and (3) additional control/configuration mechanisms, which are used to enable the transfer and processing of audio between electronic devices.

In some embodiments, a predetermined field in data channel PDUs is used to indicate to a receiver of the data channel PDU that the data in the payload portion of the data channel PDU is audio data. In some embodiments, the field in the data channel PDU can be an existing field such as the link-layer ID (LLID) field in which a value is written to distinguish the data channel PDU with audio data in the payload from other data channel PDUs (e.g., to distinguish the audio PDU from LL data PDUs and LL control PDUs).

In some embodiments, the modified version of the BTLE protocol stack includes an audio layer. The audio layer is a layer located above the link layer in the protocol stack that accepts digitally encoded audio data from the link layer for processing. In the described embodiments, upon receiving a data channel PDU for which the predetermined field is set to indicate that the payload is audio data, the link layer forwards the payload/audio data directly to the audio layer for subsequent processing. In some embodiments, the audio layer and/or applications above the audio layer can perform one or more processing steps to generate an analog signal from audio data in payloads of data channel PDUs, and a transducer can be used to output a signal generated from the analog signal.

In some embodiments, the control mechanisms include mechanisms that enable a transmitting device and a receiving device to communicate information about the capabilities of the transmitting device and/or the receiving device so that the transmitting device and/or receiving device can configure the audio data or the other device for transmission, decoding, and/or playback on the receiving device.

The described embodiments also comprise a modification to the BTLE event-based communication scheme that enables devices to avoid some of the effects of interference or data loss/corruption when communicating with other devices. Specifically, in the described embodiments, the event-based communication scheme of BTLE is modified to include additional "retransmission events" that are used to perform an automatic retransmission of data. In these embodiments, when retransmitting the data, the data is retransmitted at a different frequency than the frequency at which the data was originally transmitted to help avoid some of the effects of interference.

In the described embodiments, the event-based communication scheme comprises two different types of events: "regular" events and "retransmission" events. During a regular event, data is initially sent from a first device (e.g., higher-power device such as a smart phone) to a second device (e.g., a lower-power device such as a hearing aid) using a corresponding frequency agreed upon by the devices. (Note that regular events are similar to the events shown in FIG. 1.) During a retransmission event, the same data is resent from the first device to the second device, but using a different frequency agreed upon by the devices. In the described embodiments, the data can be resent by the first device during the retransmission event automatically, i.e., without receiving a request from the second device.

Regular events occur at a given interval agreed upon by the devices, and retransmission events are configured to occur between at least some of the regular events. Thus, a given regular event occurs at a time $T_0$ and the corresponding retransmission event can occur at a time $T_0+N$, which is between the regular event and a next regular event.

In some embodiments, if the data is successfully received during the regular event, the second device can ignore the retransmission event. Hence, the second device may place portions of certain subsystems (e.g., radios or other interface mechanisms) in a low-power mode immediately following the regular event. In this way, the second device has two opportunities to receive the data—the regular event and the retransmission event, but can selectively listen for the data during the retransmission event.

Electronic Device and Assistive-Listening Device

Figure 2:
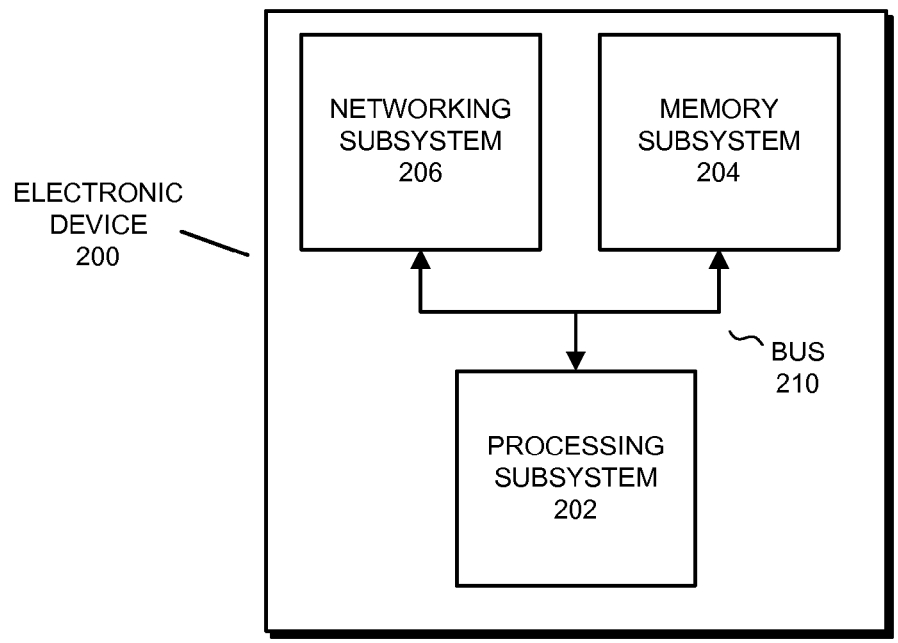
FIG. 2 presents a block diagram of an electronic device in accordance with the described embodiments.

FIG. 2 presents a block diagram of electronic device 200 in accordance with the described embodiments. Electronic device 200 includes processing subsystem 202, memory subsystem 204, and networking subsystem 206.

Processing subsystem 202 can include one or more devices configured to perform computational operations. For example, processing subsystem 202 can include, but is not limited to, one or more microprocessors, ASICs, microcontrollers, or programmable-logic devices.

Memory subsystem 204 can include one or more devices for storing data and/or instructions for processing subsystem 202 and networking subsystem 206. For example, memory subsystem 204 can include DRAM, flash memory, and/or other types of memory. In addition, memory subsystem 204 can include mechanisms for controlling access to the memory. In some embodiments, memory subsystem 204 includes a memory hierarchy that includes an arrangement of one or more caches coupled to a memory for electronic device 200. In some of these embodiments, one or more of the caches is located in processing subsystem 202.

In some embodiments, memory subsystem 204 is coupled to one or more high-capacity mass-storage devices (not shown). For example, memory subsystem 204 can be coupled to a magnetic or optical drive, a solid-state drive, or another type of mass-storage device. In these embodiments, memory subsystem 204 can be used by electronic device 200 as fast-access storage for often-used data, while the mass-storage device is used to store less frequently used data.

Networking subsystem 206 can include one or more devices configured to couple to and communicate on a wired and/or wireless network (i.e., to perform network operations). For example, networking subsystem 206 can include, but is not limited to, a Bluetooth networking system (including support for the BTLE standard), a cellular networking system (e.g., a 3G/4G network), a universal serial bus (USB) networking system, a networking system based on the standards described in Institute for Electrical and Electronic Engineers (IEEE) 802.11 (i.e., an 802.11 wireless network), an Ethernet networking system, or a wired or wireless personal-area networking (PAN) system (e.g., an infrared data association (IrDA), ultra-wideband (UWB), Z-Wave, or a network based on the standards described in IEEE 802.15).

Networking subsystem 206 can include controllers, radios/antennas for wireless network connections, sockets/plugs for hard-wired electrical connections, and/or other devices used for coupling to, communicating on, and handling data and events on a wired and/or wireless network. In some of these embodiments, networking subsystem 206 can include one or more mechanisms for forming an ad hoc network connection with other devices. In the following description, we refer to a subset of the mechanisms used for coupling to, communicating on, and handling data and events on the network at the physical layer of each network connection collectively as the "interface" for the corresponding network connection.

Within electronic device 200, processing subsystem 202, memory subsystem 204, and networking subsystem 206 are coupled together using bus 310. Bus 310 is an electrical connection that processing subsystem 202, memory subsystem 204, and networking subsystem 206 use to communicate commands and data to each other. Although only one bus 310 is shown for clarity, different embodiments can include a different number or configuration of electrical connections between the subsystems.

Electronic device 200 can be, or can be incorporated into, many different types of electronic devices. Generally, these electronic devices include any device that can communicate data to a receiving device. For example, electronic device 200 can be part of a desktop computer, a laptop computer, a server, a media player, an appliance, a subnotebook/netbook, a tablet computer, a smart phone, a piece of testing equipment, a network appliance, a set-top box, a personal digital assistant (PDA), a toy, a controller, and/or another device.

Although specific components are used to describe electronic device 200, in alternative embodiments, different components and/or subsystems may be present in electronic device 200. For example, electronic device 200 may include one or more additional processing subsystems 202, memory subsystems 204, and/or networking subsystems 206. Alternatively, one or more of the subsystems may not be present in electronic device 200. Moreover, although separate subsystems are shown in FIG. 2, in some embodiments, some or all of a given subsystem can be integrated into one or more of the other subsystems in electronic device 200.

In some embodiments, electronic device 200 may include one or more additional subsystems that are not shown in FIG. 1. For example, electronic device 200 can include, but is not limited to, a display subsystem for displaying information on a display, a data collection subsystem, an audio subsystem, an alarm subsystem, a media processing subsystem, and/or an input/output (I/O) subsystem.

Figure 3:
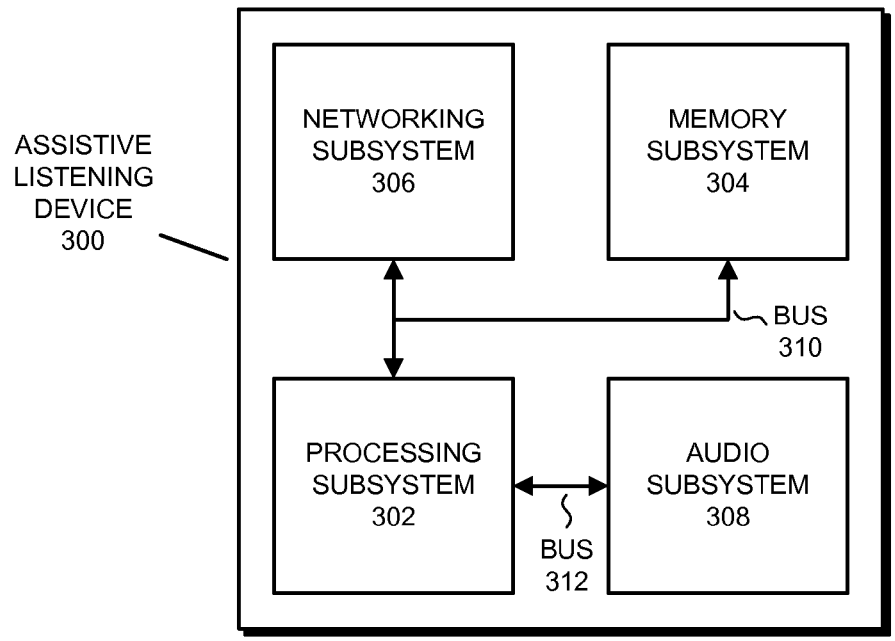
FIG. 3 presents a block diagram of an assistive-listening device in accordance with the described embodiments.

FIG. 3 presents a block diagram of an assistive-listening device 300 in accordance with the described embodiments. Generally, assistive-listening device 300 is an electronic device enables the person to perceive sound (i.e., hear or otherwise be aware of the sound). Assistive-listening device 300 includes processing subsystem 302, memory subsystem 304, networking subsystem 306, and audio subsystem 308.

Processing subsystem 302 can include one or more devices configured to perform computational operations. For example, processing subsystem 302 can include, but is not limited to, one or more processors, ASICs, microcontrollers, digital signal processors, or programmable-logic devices.

Memory subsystem 304 can include one or more devices for storing data and/or instructions for processing subsystem 302 and networking subsystem 306. For example, memory subsystem 304 can include DRAM, flash memory, and/or other types of memory. In addition, memory subsystem 304 can include mechanisms for controlling access to the memory. In some embodiments, memory subsystem 304 includes a memory hierarchy that includes an arrangement of one or more caches coupled to a memory for assistive-listening device 300. In some of these embodiments, one or more of the caches is located in processing subsystem 302.

Networking subsystem 306 can include one or more devices configured to couple to and communicate on a wired and/or wireless network (i.e., to perform network operations). For example, networking subsystem 306 can include, but is not limited to, a Bluetooth networking system (including support for the BTLE standard), a cellular networking system (e.g., a 3G/4G network), a networking system based on the standards described in Institute for Electrical and Electronic Engineers (IEEE) 802.11 (i.e., an 802.11 wireless network), or a wireless personal-area networking (PAN) system (e.g., an infrared data association (IrDA), ultra-wideband (UWB), Z-Wave, or a network based on the standards described in IEEE 802.15).

Networking subsystem 306 can include controllers, radios/antennas for wireless network connections, sockets/plugs for hard-wired electrical connections, and/or other devices used for coupling to, communicating on, and handling data and events on a wired and/or wireless network. In some of these embodiments, networking subsystem 306 can include one or more mechanisms for forming an ad hoc network connection with other devices.

In some embodiments, the Bluetooth networking system in networking subsystem 306 is configured as a single-mode Bluetooth networking system, whereas in other embodiments, the Bluetooth networking system in networking subsystem 306 is configured as a dual-mode Bluetooth networking system.

Audio subsystem 308 can include one or more transducers configured to generate and/or output signals that a user of assistive-listening device 300 can perceive as sound. For example, audio subsystem 308 can include speakers, amplifiers, drivers, vibrating mechanisms, lights, and/or other transducers. Additionally, in some embodiments, audio subsystem 308 includes one or more decoder circuits, transcoder circuits, converter circuits, and/or other devices for processing audio data.

In some embodiments, processing subsystem 302 provides an analog signal (e.g., on bus 312) that audio subsystem 308 uses to generate an output sound. In alternative embodiments, processing subsystem 302 provides a digital signal that audio subsystem 308 decodes or otherwise processes to generate one or more signals for generating an output sound.

Within assistive-listening device 300, processing subsystem 302, memory subsystem 304, and networking subsystem 306 are coupled together using bus 310, and processing subsystem 302 and audio subsystem 308 are coupled together using bus 312. Bus 310 is an electrical connection that processing subsystem 302, memory subsystem 304, and networking subsystem 306 can use to communicate commands and data to each other, and bus 312 is an electrical connection that processing subsystem 302 and audio subsystem 308 can use to communicate commands and data to each other. Although busses 310 and 312 are shown for clarity, different embodiments can include a different number and/or configuration of electrical connections. Generally, assistive-listening device 300 comprises sufficient electrical connections to enable processing subsystem 302, memory subsystem 304, networking subsystem 306, and audio subsystem 308 to communicate with one another as necessary.

Assistive-listening device 300 can be, or can be incorporated into many different types of electronic devices. Generally, these electronic devices include any device that a person can use to assist with the perception of sound. For example, assistive-listening device 300 can be a hearing aid, a cochlear implant, a vibrating device, a speaker, a headphone (or a pair of headphones), a display device, a tactile device, and/or another device.

Although we use specific components to describe assistive-listening device 300, in alternative embodiments, different components and/or subsystems may be present in assistive-listening device 300. For example, assistive-listening device 300 may include one or more additional processing subsystems 302, memory subsystems 304, and/or networking subsystems 306. Alternatively, one or more of the subsystems may not be present in assistive-listening device 300. Moreover, although separate subsystems are shown in FIG. 3, in some embodiments, some or all of a given subsystem can be integrated into one or more of the other subsystems in assistive-listening device 300.

In some embodiments, assistive-listening device 300 may include one or more additional subsystems that are not shown in FIG. 3. For example, assistive-listening device 300 can include, but is not limited to, a data collection subsystem, a display subsystem, and/or an input/output (I/O) subsystem. In some embodiments, assistive-listening device 300 includes one or more batteries (not shown) that provide power for assistive-listening device 300.

In some embodiments, assistive-listening device 300 can be a low-power device. In these embodiments, some or all of processing subsystem 302, memory subsystem 304, networking subsystem 306, and audio subsystem 308 can be configured as low-power mechanisms. For example, processing subsystem 302 can be a low-power processing mechanism and/or a processing mechanism with limited functionality. Moreover, in some embodiments, processing subsystem 302, memory subsystem 304, networking subsystem 306, and audio subsystem 308 can be custom-built to perform the indicated functions (processing, storing instructions and/or data, etc.) in assistive-listening device 300, e.g., can be custom ASICs.

In some embodiments, assistive-listening device 300 is worn or otherwise carried by a user (not shown) and provides assistance to the user in perceiving selected sound(s). For example, assistive-listening device 300 can be worn or implanted in the ear as a hearing aid and/or can be worn as a headphone or headphones with the appropriate mounting hardware (straps, frames, adhesives, fasteners, etc.), can be carried in hand or worn on the body, and/or can otherwise be made available to the user.

Figure 4:
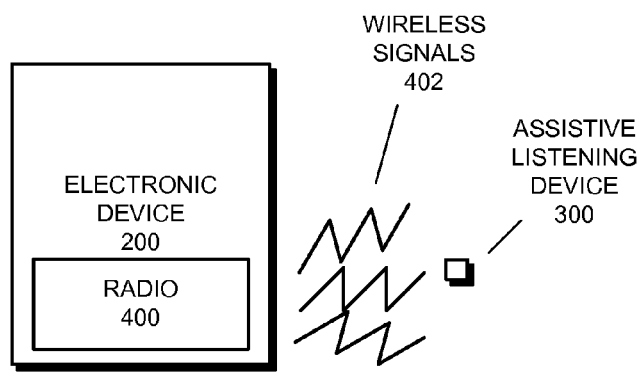
FIG. 4 presents a block diagram illustrating a system in accordance with the described embodiments.

FIG. 4 presents a block diagram illustrating a system in accordance with the described embodiments. As can be seen in FIG. 4, wireless signals 402 are transmitted from a radio 400 (e.g., in networking subsystem 206) in electronic device 200. Wireless signals 402 are received by the corresponding network interface in networking subsystem 306 in assistive-listening device 300 and processed by networking subsystem 306 and/or processing subsystem 302 in assistive-listening device 300. Although not shown in FIG. 4, wireless signals can also be transmitted from a radio in assistive-listening device 300 and received by radio 400 (or another radio in electronic device 200). Generally, sufficient wireless signals are communicated between electronic device 200 and assistive-listening device 300 to enable the formation and maintenance of a BTLE network connection and the communication of data (e.g., audio data) between electronic device 200 and assistive-listening device 300.

Note that although we describe embodiments using assistive-listening device 300, alternative embodiments use two electronic devices 200 and/or other devices. Generally, the described embodiments can use any pair of devices where one device is a transmitter of audio data and the other device is a receiver of audio data. In addition, in some embodiments, two separate connections can be established with electronic device 100 if a user has two assistive-listening devices 200 (e.g., one for each ear).

Data Channel Protocol Data Unit (PDU)

Figure 5:
FIG. 5 presents a block diagram illustrating an exemplary data channel PDU in accordance with the described embodiments.

FIG. 5 presents a block diagram illustrating an exemplary data channel PDU 500 in accordance with the described embodiments. As shown in FIG. 5, data channel PDU 500 comprises header 502 and payload 504, in addition to preamble (PREA 506), access address (ADDR 508), and CRC 510. In the described embodiments, a field in header 502 is used to indicate whether payload 504 contains audio data (or contains some other data). More generally, with the exception of the uses herein described, the fields in data channel PDU 500 are used as described in the BTLE specification.

Figure 6:
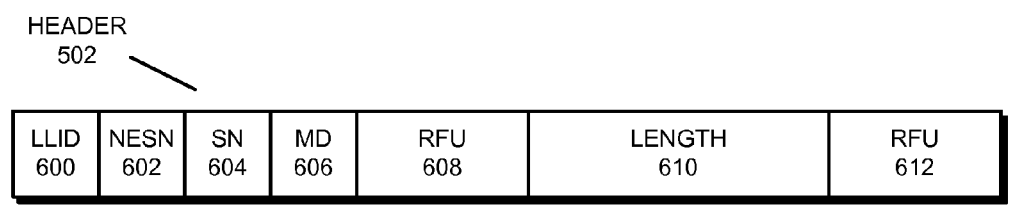
FIG. 6 presents a block diagram illustrating an expanded view of a header for a data channel PDU in accordance with the described embodiments.

FIG. 6 presents a block diagram illustrating an expanded view of a header 502 for a data channel PDU 500 in accordance with the described embodiments. As can be seen in FIG. 6, header 502 comprises the following fields: LLID 600, NESN 602, SN 604, MD 606, RFU 608, LENGTH 610, and RFU 612. These fields are generally similar to data channel PDU header fields that are known in the art and hence their functions (aside from the functions herein described) are not described in detail.

Unlike the existing BTLE standard, in some embodiments, the LLID 600 field can be used to indicate whether payload 504 of data channel PDU 500 contains audio data. The LLID 600 field is a two-bit field that is used in existing implementations of the BTLE standard to indicate whether the PDU is an LL data PDU or an LL control PDU. Because only 3 combinations of the two-bit LLID 600 field are used in making this indication, the described embodiments employ a previously-unused combination of the bits of the LLID 600 field (i.e., combination "00") to indicate that payload 504 contains audio data. Thus, in these embodiments, the type of data channel PDU 500 can be indicated as follows using the possible combinations in the LLID 600 field:

00—Audio data;
01—LL data PDU;
10—LL data PDU; or
11—LL control PDU.

When the LLID 600 field is set to 00, thereby indicating that audio data is present in payload 504, the logical link 704 layer (see FIG. 7) in protocol stack 700 can forward data from payload 504 to the audio 712 layer for processing. Note that forwarding payload 504 to audio 712 layer is an operation that was previously not possible in implementations of the BTLE standard both because there was no audio 712 layer, and because the 00 value of the LLID 600 field was unused.

Note that, although we describe header 502 using the illustrated fields, in some embodiments, header 502 contains a different number, arrangement, and/or type of fields. Generally, header 502 contains sufficient data for a receiving device (e.g., assistive-listening device 300) to determine whether or not the payload of the PDU contains audio data.

In some embodiments, when data channel PDU 500 contains audio data, the entire payload 504 can be audio data. That is, there may be no header or other information for audio 712 layer in payload 504. Because this is true, these embodiments can increase the amount of audio data that is included in a given data channel PDU 500, thereby reducing the amount of BTLE network traffic required to transfer the audio data and/or increasing the amount of audio data that can be transferred in a given amount of time (which can mean that the audio quality can be improved). In addition, the some embodiments can use the maximum number of bits (i.e., the maximum payload size) allowed for a payload when transmitting audio data. For example, in some embodiments the maximum payload size is 31 octets of audio data (note that the LENGTH 510 field in header 402 can indicate a length/number of octets in payload 404).

Protocol Stacks

In the described embodiments, electronic device 200 includes one or more protocol stacks that are used to manage the transfer of data to and from electronic device 200 using an appropriate interface in networking subsystem 206. For example, an operating system (not shown) executing on electronic device 200 can include software mechanisms that manage the transfer of data to and from the network interfaces in networking subsystem 206 for applications executing on electronic device 200. Each of the protocol stacks included in electronic device 200 includes a number of logical layers. For example, electronic device 200 can maintain a BTC/BTLE protocol stack that comprises a physical RF layer, a baseband (BB) layer, a link (LL) layer, an L2CAP layer, etc. At each layer of a given protocol stack, electronic device 200 includes hardware and/or software mechanisms for performing the functions associated with the layer.

Assistive-listening device 300 also includes one or more protocol stacks that are used to manage the transfer of data to and from assistive-listening device 300 using an appropriate interface in networking subsystem 306. For example, an operating system, a controller, and/or firmware (not shown) executing on assistive-listening device 300 can include software mechanisms that manage the transfer of data to and from the network interfaces in networking subsystem 306 for applications executing on assistive-listening device 300 and/or for other hardware mechanisms (e.g., an audio data processor and/or digital-to-analog converter) in assistive-listening device 300.

Figure 7:
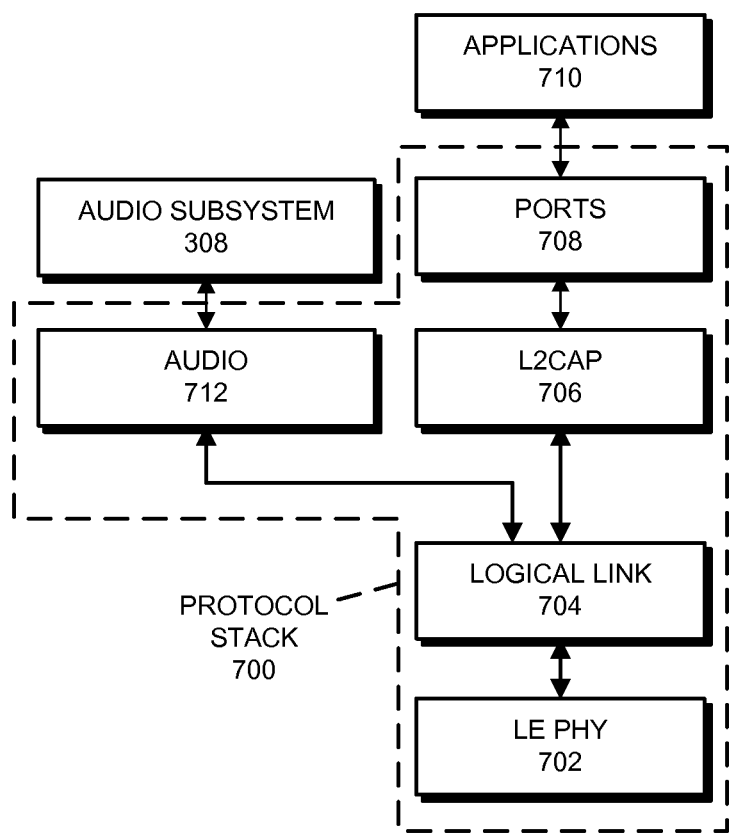
FIG. 7 presents a block diagram of a Bluetooth Low Energy protocol stack in accordance with the described embodiments.

FIG. 7 presents a block diagram of a BTLE protocol stack 700 in assistive-listening device 300 in accordance with the described embodiments. Note that protocol stack 700 shown in FIG. 7 differs from existing BTLE protocol stacks because protocol stack 700 includes the audio 712 layer, and can therefore handle audio data, as is herein described.

As can be seen in FIG. 7, protocol stack 700 comprises a number of different hardware and software mechanisms, including the LE PHY 702 layer, which is the physical/hardware layer of the BTLE protocol stack, and the logical link 704 and L2CAP 706 layers, that are implemented in software/firmware (e.g., executed by processing subsystem 302 and/or networking subsystem 306). Protocol stack 700 also includes ports 708, which serve as interfaces between protocol stack 700 and applications 710 executing on assistive-listening device 300. (Note that the "applications 710" may simply be functions of the operating system/firmware/controller in assistive-listening device 300, and may not be standalone applications such as in more complex electronic devices). Aside from the functions herein described, the functions performed by the layers of protocol stack 700 are generally known in the art and hence are not described.

Audio 712 layer is a software mechanism executed by processing subsystem 302 that is configured to process incoming audio data. Generally, the logical link 704 layer reads incoming data channel PDUs 400 to determine if the data channel PDUs 400 contain audio data, and, if not, logical link 704 layer can process data channel PDU 500 accordingly. Otherwise, if the data channel PDUs 400 contain audio data, logical link 704 layer can forward data in payload 504 from the data channel PDU 500s to audio 712 layer for subsequent processing (e.g., as an audio stream). The subsequent processing is described in more detail below.

In some embodiments, the network protocol stacks in electronic device 100 and assistive-listening device 200 provide applications on electronic device 100 and assistive-listening device 200 access to the attribute protocol (ATT) and generic attribute protocol (GATT), as are known in the art. In some of these embodiments, assistive-listening device 200 can function as a GATT server, and electronic device 100 can function as a GATT client and can access (read, write, modify) data in assistive-listening device 200.

In some embodiments, device discovery and connection establishment between electronic device 100 and assistive-listening device 200 follows the BTLE specification. In some of these embodiments, electronic device 100 can take on the role of "central" and assistive-listening device 200 the role of "peripheral." For example, assistive-listening device 200 can send an advertisement PDU with advertisement data periodically using an advertising interval of N seconds (e.g., 1-5 seconds), with a UUID for assistive-listening device 200 included in the advertising data.

Audio Subsystem

Figure 8:
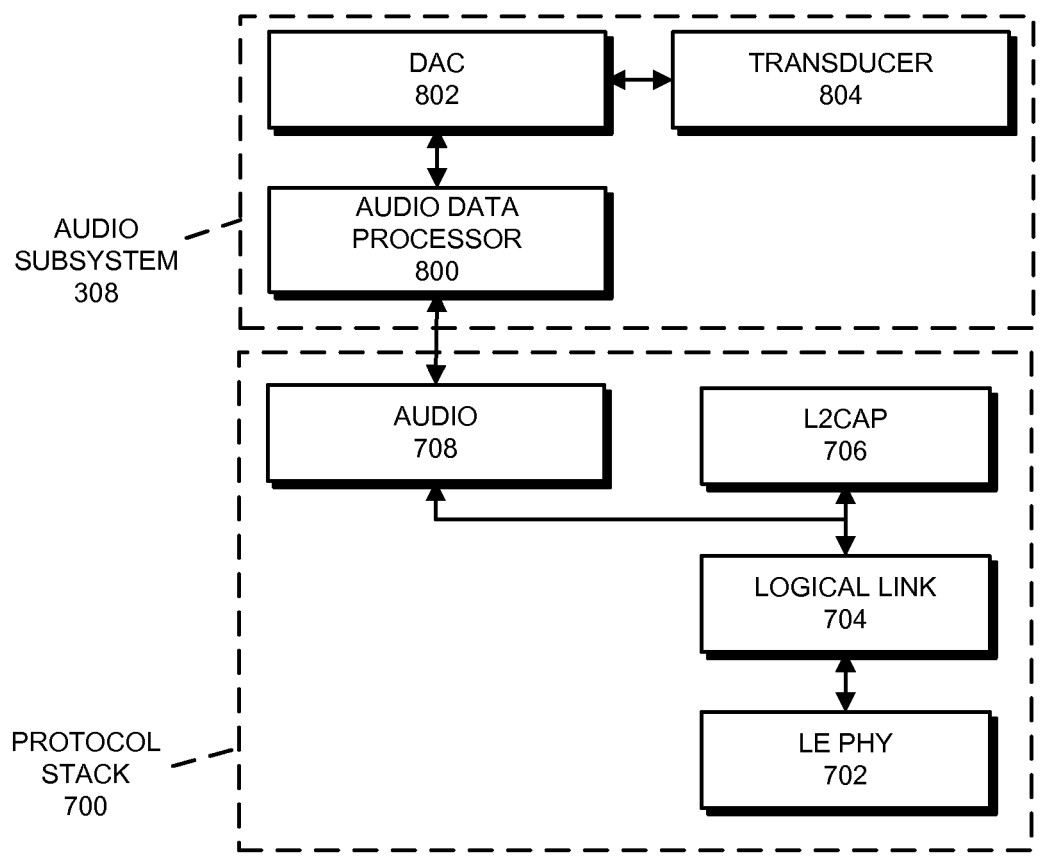
FIG. 8 presents a block diagram illustrating an audio subsystem in accordance with the described embodiments.

FIG. 8 presents a block diagram illustrating audio subsystem 308 in assistive-listening device 300 in accordance with the described embodiments. As can be seen in FIG. 8, audio subsystem 308 comprises an audio data processor 800, a digital-to-analog converter (DAC) 802, and a transducer 804. Audio data processor 800 is configured to perform operations to generate processed digital data from data received from audio 712 layer. The processed digital data is then forwarded from audio data processor 800 to DAC 802, where an analog signal is generated from the processed digital data. The analog signal is sent to transducer 804 for generation of signals (sound, vibrations, etc.) that can be perceived as sound by a user of assistive-listening device 300.

In the described embodiments, in electronic device 200, audio data can be compressed, encoded, and/or otherwise processed before a data channel PDU 500 is generated from the audio data. For example, in some embodiments, the processing can be performed to reduce the overall bit-length/size of the audio data to enable the audio data to be transmitted in as few data channel PDUs 400 as possible, while still maintaining a predetermined audio quality level (here, "quality level" is defined as an ability of a listener to perceive given aspects of an output audio signal generated from the audio data). In some embodiments, the processing comprises G.711, G. 722, G.722.1, and/or G. 726 encoding, MP3 encoding, and/or AAC-ELD encoding.

Because audio data received from electronic device 200 is encoded, compressed, and/or otherwise processed, audio data processor 800 can perform one or more operations to restore the audio signal from the received audio data and/or process the received audio data. For example, audio data processor 800 can decode, transcode, convert, amplify, normalize, shape, attenuate, reconfigure, customize, and/or otherwise process the audio data. In some embodiments, this processing includes G.711/G.726/G.722/G.722.1 decoding, MP3 decoding, and/or AAC decoding Transducer 804 generally comprises any device or combination of devices that can output a signal that can be perceived as a sound and/or as a proxy for sound by a person using assistive-listening device 300. For example, transducer 804 can be a speaker, a vibrator, an electrical signal generator, a visual signal generator, a tactile signal generator, and/or another device that can output sound, electrical, vibration, visual, tactile, and/or other types of signals.

Although an arrangement of functional blocks is shown in FIG. 8, in some embodiments, some or all of the functional blocks are included in other functional blocks and/or are included elsewhere in assistive-listening device 300. For example, audio data processor 800 and/or DAC 802 can be included in the audio 712 layer of the protocol stack. Moreover, in some embodiments, some or all of audio subsystem 308 can be included in processing subsystem 302 and/or networking subsystem 306, i.e., the functions being described as being performed by audio subsystem 308 can be performed by general-purpose circuits in processing subsystem 302 when processing subsystem 302 executes program code and/or firmware.

Communication Between Devices

Figure 9:
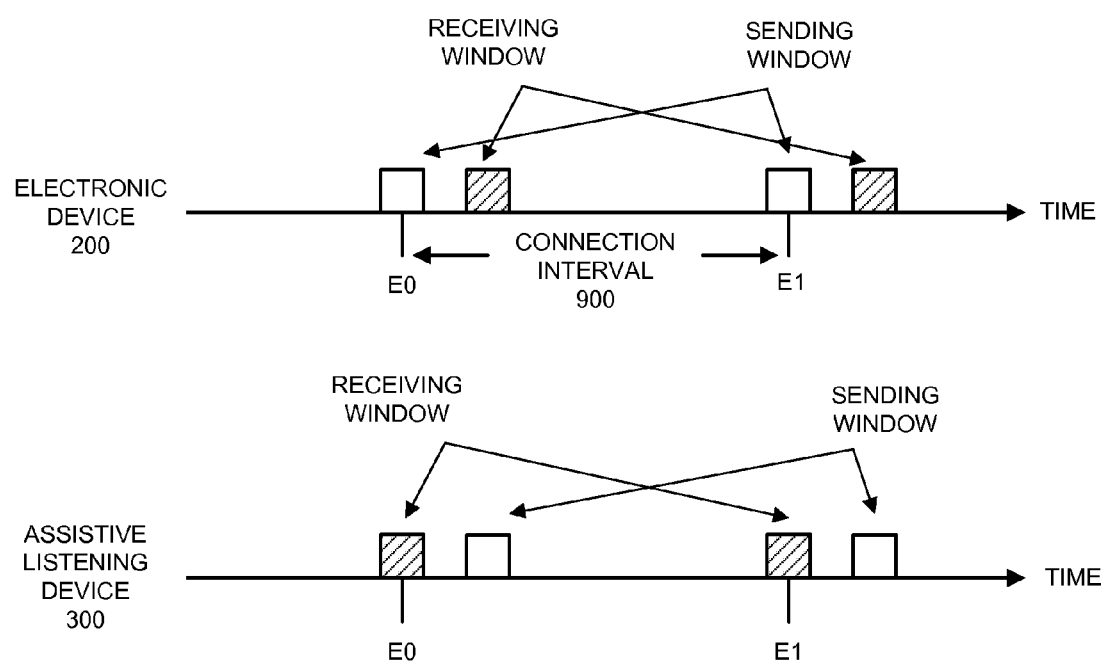
FIG. 9 presents a timeline diagram of communication between devices in accordance with the described embodiments.

FIG. 9 presents a timeline diagram of communication between devices in accordance with the described embodiments. More specifically, FIG. 9 presents a timeline diagram of communications between electronic device 200 and assistive-listening device 300 using an event-based communication scheme. The communication shown in FIG. 9 occurs after a BTLE network connection has been established between electronic device 200 and assistive-listening device 300 using techniques known in the art.

In the described embodiments, connection interval 900 can be a predetermined length of time (and hence the events occur at a predetermined interval). For example, connection interval 900 can be 1 second long, 3 seconds long, etc. (or, more generally, any connection interval that is allowable in accordance with the BTLE standard).

In the described embodiments, the length of connection interval 900 can be dynamically set (i.e., set while electronic device 200 and assistive-listening device 300 are operating) to place the electronic device 200 and assistive-listening device 300 in a given mode. For example, in some embodiments, electronic device 200 and assistive-listening device 300 can operate in two modes, an active communication mode and a resting mode. During the resting mode, connection interval 900 can be a longer interval, e.g., 1 s, 2 s, etc., and during the active communication mode, connection interval 900 can be a shorter interval, e.g., 8 ms, 12 ms, 1 s, etc. These modes can be automatically configured (e.g., can be entered or exited at a given time or upon a predetermined event happening) and/or can be configured using the process described below with respect to FIG. 20.

Generally, during the active communication mode, connection interval 900 is configured to enable electronic device 200 and assistive-listening device 300 to communicate data (e.g., audio data, control/configuration data, and/or other data) at a predetermined rate. For example, if a bit-rate of N bits per second is to be used to transfer data, and a payload 504 of each data channel PDU 500 is at most K bits long, connection interval 900 can be set accordingly.

During the resting mode, connection interval 900 is configured to enable electronic device 200 and assistive-listening device 300 to consume less power than in the active communication mode, while still being sufficiently responsive to begin higher-speed communication data between electronic device 200 and assistive-listening device 300 when data becomes available. For example, assuming that electronic device 200 is a phone and assistive-listening device 300 is a hearing-aid, in the resting mode, connection interval 900 should be a short enough time to enable electronic device 200 and assistive-listening device 300 to respond in time to answer the phone call. More specifically, an event should happen sufficiently often to enable electronic device 200 to communicate to assistive-listening device 300 that the active communication mode is to be entered so that the phone call can be answered in a reasonable time (e.g., 1 second, 2 seconds, etc.).

As described below, the described embodiments may also include retransmission events during which a transmitting device (e.g., electronic device 200) automatically resends data that was originally transmitted during a corresponding regular event. The retransmission events can be configured in a similar way to connection interval 900. For example, in some embodiments, the timing of retransmission events adjusts along with the regular events (e.g., E0 and E1 in FIG. 9), keeping the retransmission events timed midway between the regular events. In other embodiments, the timing of retransmission events can be adjusted independently of regular events. For clarity, the retransmission windows are not shown in FIG. 9.

Configuration

As indicated above with respect to connection interval 900, the described embodiments can dynamically configure aspects of the communication between electronic device 200 and assistive-listening device 300 and/or of the processing of data in electronic device 200 and assistive-listening device 300. For example, in addition to connection interval 900, in some embodiments, electronic device 200 and assistive-listening device 300 can configure the type of processing that is performed on the audio data that is communicated between electronic device 200 and assistive-listening device 300. In these embodiments, the processing can include any of the above-described compression, encoding, transcoding converting, amplifying, normalizing, shaping, attenuating, reconfiguring, customizing, etc. The described embodiments can also configure other aspects, such as channels used, signal strengths, sending/receiving window length, etc.

For example, in some embodiments, electronic device 200 and assistive-listening device 300 can exchange data channel PDUs 400 to configure connection interval 900 as described above. In these embodiments, while operating in the active communication mode at runtime, electronic device 200 can determine that limited or no data is likely to be sent to assistive-listening device 300 for a given amount of time (e.g., 10 seconds, 1 minute, etc.), and can send a data channel PDU 500 at an appropriate event time to cause assistive-listening device 300 to enter the rest mode. Upon subsequently determining that data is to be sent to assistive-listening device 300, electronic device 200 can send another data channel PDU 500 at an appropriate event time to cause assistive-listening device 300 to enter the active communications mode. When entering either mode, assistive-listening device 300 and electronic device 200 begin using the corresponding connection interval 900. Note that, in some embodiments, the data channel PDU 500 in this example may be consumed/read at the logical link 704 layer and used to configure lower layers of protocol stack 700 (e.g., the radios, etc.).

As another example, in some embodiments, as one of the initial operations when preparing to communicate audio data, assistive-listening device 300 can send a data channel PDU 500 to electronic device 200 with a payload that indicates a type (or types) of audio processing that is (are) supported by audio data processor 800. For example, assistive-listening device 300 can indicate what types of audio data decoding are supported. Electronic device 200 can then configure its audio processing accordingly, and, if assistive-listening device 300 supports multiple types of audio processing, e.g., multiple types of decoders, can indicate in a data channel PDU 500 to assistive-listening device 300 which data processing will be used. In this way, audio data processing aspects are configured before communication of audio data begins. Because configuration data need not be carried in the data stream after the initial configuration operations are completed, subsequent communication can include a larger proportion of audio data per payload (than systems that include configurations with audio data PDUs).

In some embodiments, when configuring the decoders (or "codecs") that are to be used, electronic device 100 (the audio "source"—which can be the "master" on the BTLE link) can start by sending a prioritized list of codecs supported by electronic device 100 in a dedicated configuration PDU (a prioritized_supported_codec_list PDU) to assistive-listening device 200 (the audio "sink"—which can be the "slave" on the BTLE link). Assistive-listening device 200 can then respond to electronic device 100 with a prioritized list of codecs supported by assistive-listening device 200 using a prioritized_supported_codec_list PDU. Electronic device 100 next decides what codec to use and sends a confirmation configuration PDU (a select_codec PDU). (Note that, although we describe this exchange, some embodiments only perform a one-sided exchange during which a configuration PDU is sent from assistive-listening device 200 to electronic device 100 to enable electronic device 100 to determine the codecs supported by assistive-listening device 200, one of which can be selected by electronic device 100.)

In some embodiments, in the prioritized_supported_codec_list PDU, each codec can be numerically represented by a predetermined numeric codec ID (CoID) that is a predetermined fixed length. For example, in some embodiments, the CoID can be one octet in length, two octets in length, etc. In some embodiments, a maximum of N CoIDs (e.g., 22, 28, etc.) may be sent in a prioritized_supported_codec_list PDU. If more than N codecs are supported by a given device, a last octet in the prioritized_supported_codec_list PDU can be set to a predetermined value (e.g., 0, 255, etc.) to indicate that more codecs are supported. A subsequent prioritized_supported_codec_list PDU can then be sent with the remaining codecs—an operation that can be repeated until all supported codecs have been communicated from one device to the other.

In some embodiments, within a prioritized_supported_codec_list PDU, the codecs can be ordered in priority or preference order by the sender. For example, assuming a CoID of one octet, a first octet in a prioritized_supported_codec_list can contain the codec that the sender would most prefer using. The second octet, the sender's second choice and so on. In some embodiments, the prioritized_supported_codec_list PDU sent by assistive-listening device 200 can be ordered in accordance with the listing of the codecs in the prioritized_supported_codec_list PDU sent from electronic device 100 (i.e., assistive-listening device 200 can attempt to match the list to the extent possible, etc.).

In some embodiments, the select_codec PDU can comprise an octet (or octets) that list the CoID of the codec to be used (e.g., the codec selected by electronic device 100). The select_codec PDU may also comprise additional codec-specific parameters.

As described herein, the codec may be changed during a communication session (i.e., while electronic device 100 and assistive-listening device 200 are communicating using a BTLE link). For example, in some embodiments, electronic device 100 can determine that a different codec from the list of codecs previously described by assistive-listening device 200 in a prioritized_supported_codec_list PDU is to be used. Before the different codec is used, electronic device 100 can send a PDU indicating that the audio stream is to be stopped, then send a select_codec PDU indicating the new codec to be used, and next restart the audio stream using the new codec. Note that, in some embodiments, assistive-listening device 200 may acknowledge the new codec before electronic device 100 starts using the codec.

In another example, of the configuration that can be performed, in some embodiments, electronic device 200 can configure aspects of the signals (sound, vibrations, light, etc.) that are output from transducer 804 in assistive-listening device 300. In these embodiments, electronic device 200 can communicate data channel PDUs 400 to assistive-listening device 300 indicating that the signals that are output from transducer 804 should be modified in some way, including the above-described amplifying, normalizing, shaping, attenuating, reconfiguring, customizing, etc. In some of these embodiments, one or more applications 710 on assistive-listening device 300 can receive the payloads 404 from the data channel PDUs 400 communicated from electronic device 200 (e.g., from the L2CAP 706 layer through ports 708), and can configure the audio 712 layer in protocol stack 700 and/or audio subsystem 308 to modify the signals output from transducer 804.

In some of these embodiments, electronic device 200 can be configured to recognize when the signals that are output from transducer 804 should be modified in some way, and can be configured to communicate the modification to assistive-listening device 300. In other embodiments, electronic device 200 can execute an application that provides a user interface that allows a local and/or remote user to configure the sound output from assistive-listening device 300. For example, in some embodiments, a person can remotely log-in to electronic device 200 and use the interface to adjust the sound output by assistive-listening device 300 (where assistive-listening device 300 is a hearing aid).

Note that the described embodiments are not limited to configuration as an initial operation. In these embodiments, configuration is performed anytime, as necessary; including reconfiguration. Moreover, although we describe the prioritized_supported_codec_list PDU and the select_codec PDU as separate PDUs, in some embodiments, a dedicated, but generic configuration PDU is used for multiple operations, with a code set in the PDU for different functions. For example, along with codes for prioritized_supported_codec_list and select_codec, the configuration PDU can include codes for "start stream" and "stop stream" which indicate that the audio stream from the source (e.g., electronic device 100) is to be started or stopped, "version," etc.

Figure 10:
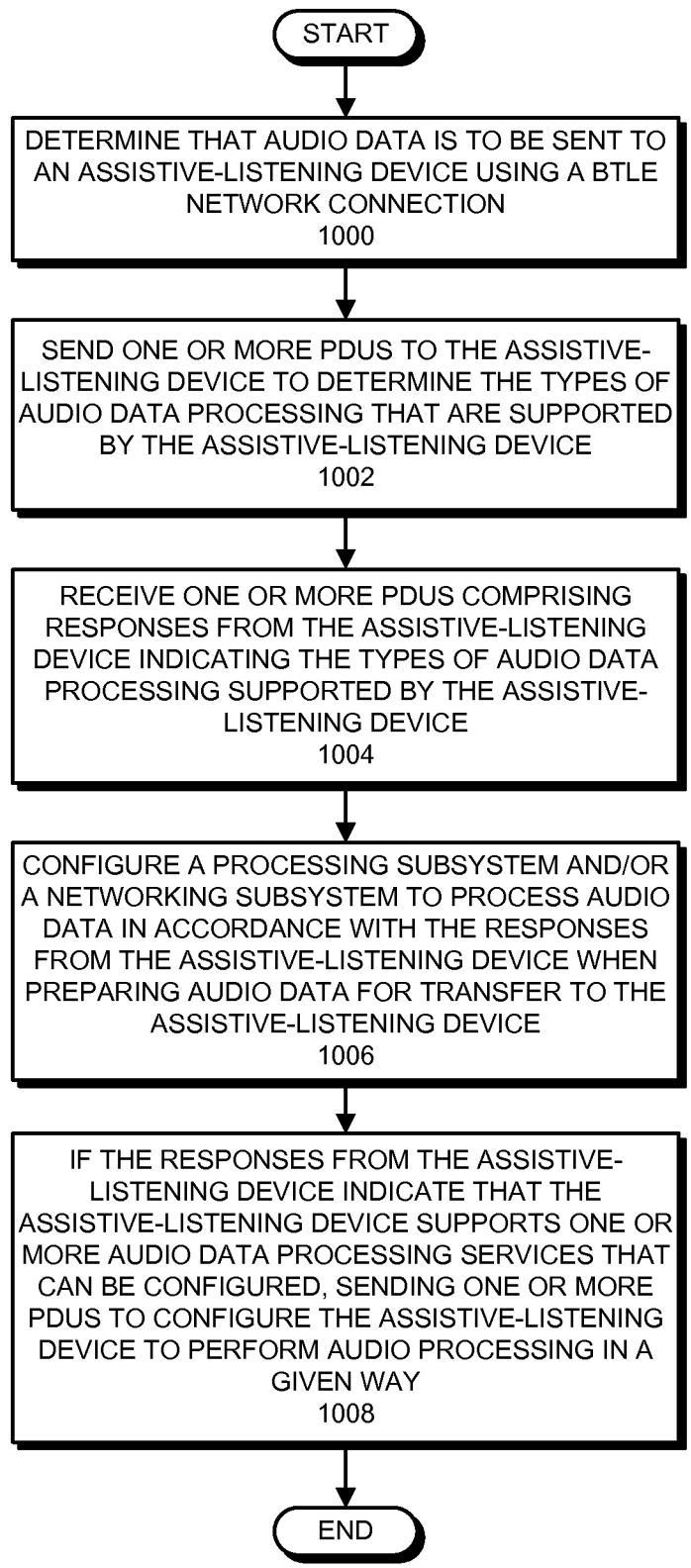
FIG. 10 presents a flowchart that illustrates a process for configuring an electronic device and an assistive-listening device for communicating audio in accordance with the described embodiments.

FIG. 10 presents a flowchart that illustrates a process for configuring electronic device 200 and assistive-listening device 300 for communicating audio data in accordance with the described embodiments. For this example, it is assumed that a BTLE network connection was previously established. Note that, although we use the operations shown in FIG. 10 to describe the process, in alternative embodiments, the operations may be performed in a different order and/or more or fewer operations may be performed for configuring electronic device 200 and assistive-listening device 300 for communicating audio data.

As can be seen, the process in FIG. 10 starts when electronic device 200 determines that audio data is to be sent to assistive-listening device 300 using a BTLE network connection (step 1000). For example, an operating system in electronic device 200 can receive a request from an application to begin transferring audio data on the BTLE network connection or can otherwise determine that audio data is to be sent to assistive-listening device 300. Electronic device 200 then sends one or more data channel PDUs 400 to assistive-listening device 300 to determine the types of audio data processing that are supported by assistive-listening device 300 (step 1002). For example, electronic device 200 can send one or more requests to determine an audio decoder, an audio converter, an amplifier, an equalizer, and/or other types of audio processing provided by assistive-listening device 300. In some embodiment, each data channel PDU 500 sent by electronic device 200 comprises one request (e.g., a request for types of decoders in assistive-listening device 300). In alternative embodiments, electronic device 200 can send one or more compound requests to determine the types of audio data processing supported by assistive-listening device 300 (e.g., a single request for all types of data processing supported by assistive-listening device 300).

Next, electronic device 200 receives one or more data channel PDUs 400 that comprise responses from assistive-listening device 300 indicating the types of audio data processing that are supported by assistive-listening device 300 (step 1004). For example, electronic device 200 can receive one or more responses indicating that assistive-listening device 300 includes an AAC decoder and a particular type of equalizer.

Electronic device 200 then configures processing subsystem 202 and/or networking subsystem 206 to process audio data in accordance with the responses from assistive-listening device 300 when preparing audio data for transfer to assistive-listening device 300 (step 1006). For example, assuming that the responses from assistive-listening device 300 indicate that the above-described AAC decoder is included in assistive-listening device 300, electronic device 200 can configure processing subsystem 202 (or another mechanism in electronic device 200) to encode audio data using the AAC encoding scheme.

Depending on the type of processing supported by assistive-listening device 300, electronic device 200 may also subsequently send one or more data channel PDUs 400 to configure assistive-listening device 300 to perform audio processing in a given way (step 1008). For example, assuming that assistive-listening device 300 indicates support for the above-described equalizer, electronic device 200 can send one or more data channel PDUs 400 to configure settings of the equalizer (e.g., to normalize the audio data in assistive-listening device 300, etc.).

Note that, when electronic device 200 sends data channel PDUs 400 to assistive-listening device 300, electronic device 200 can send any type of data channel PDUs 400 to assistive-listening device 300. For example, electronic device 200 can send data channel PDUs 400 that are read/consumed by the logical link 704 layer for configuring lower levels of protocol stack 700, can send data channel PDUs 400 that are read/consumed by the L2CAP 706 layer and forwarded to applications 710 for configuring assistive-listening device 300, etc. The same is true for response data channel PDUs sent from assistive-listening device 300 to electronic device 200.

In some embodiments, a user of an electronic device in communication with electronic device 100 (or another electronic device that is in communication with assistive-listening device 200) can use the above-described data channel PDUs 400 to configure one or more operations performed by assistive-listening device 200 when processing audio data (e.g., equalization, amplification, etc.). For example, an audiologist, a parent, and/or another entity (including possibly a second electronic device, e.g., a computer system) can determine that audio data is to be processed in assistive-listening device 200 in a particular way, and can use a configuration application or web interface (e.g., on a home computer and/or in a doctor's office) to send corresponding data channel PDUs 400 with configuration information to assistive-listening device 200 (perhaps through electronic device 100). This can include forming a network connection (Bluetooth, WiFi, PAN, etc.) with electronic device 100 from another electronic device, and using the herein-described mechanisms in electronic device 100 to communicate with assistive-listening device 200.

Figure 11:
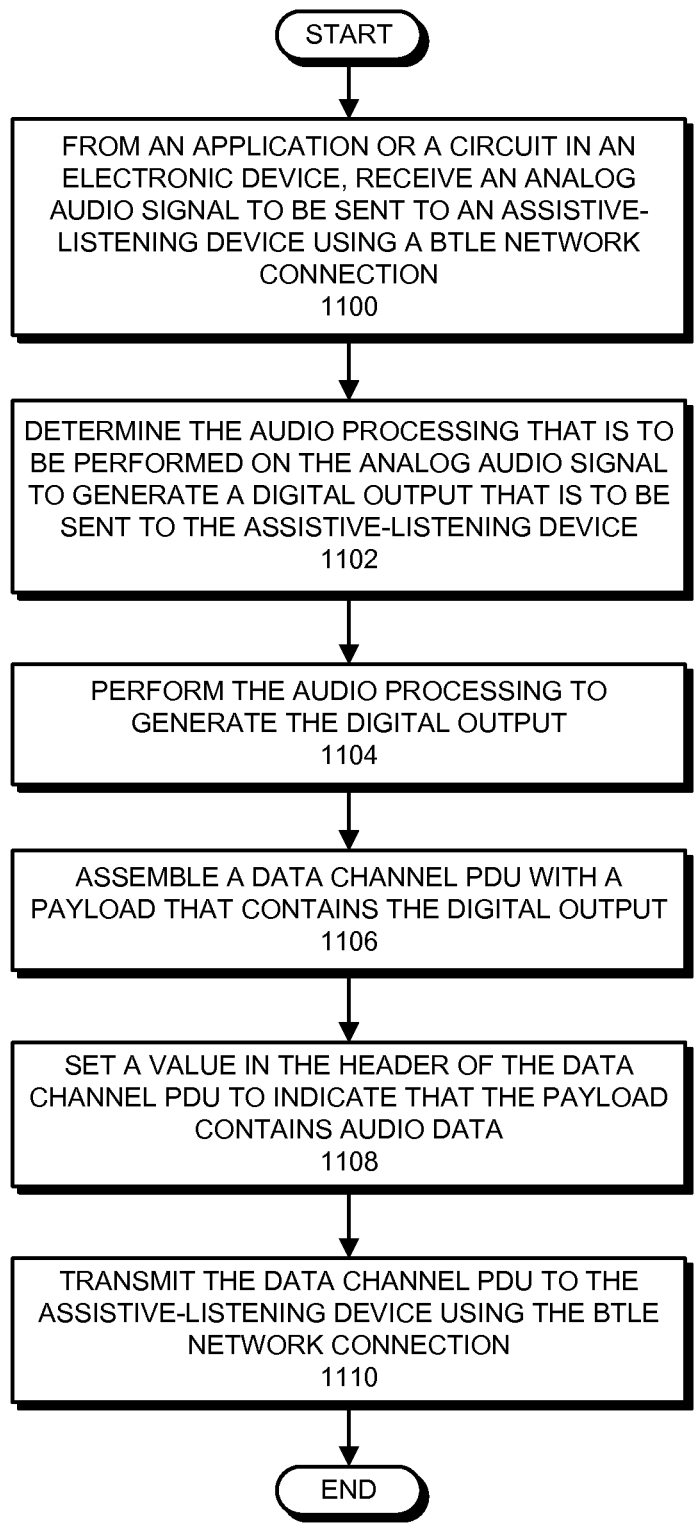
FIG. 11 presents a flowchart illustrating a process for sending audio data from an electronic device using a BTLE network connection in accordance with the described embodiments.
Figure 12:
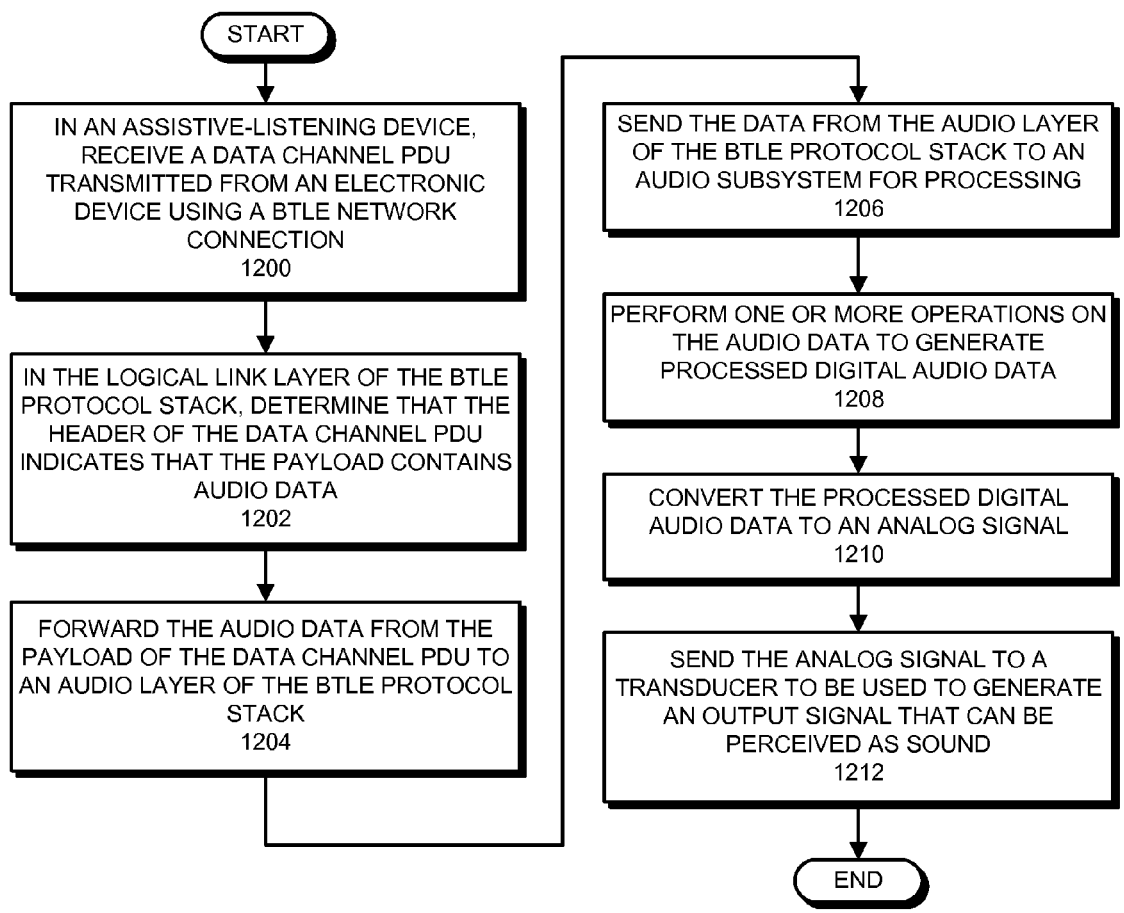
FIG. 12 presents a flowchart illustrating a process for receiving audio data in an assistive-listening device using the BTLE network connection in accordance with the described embodiments.

Sending and Receiving Audio Data Using the Bluetooth Low Energy Network Connection FIG. 11 presents a flowchart illustrating a process for sending audio data using a BTLE network connection from an electronic device 200 in accordance with the described embodiments. FIG. 12 presents a flowchart illustrating a process for receiving audio data using the BTLE network connection in an assistive-listening device 300 in accordance with the described embodiments. For this example, it is assumed that the BTLE network connection was previously established and that the configuration operations described in FIG. 9 have been performed. Although we use the operations shown in FIG. 11-12 to describe these processes, in alternative embodiments, the operations may be performed in a different order and/or more or fewer operations may be performed.

Although we describe the configuration operations as having already been performed, in the described embodiments, configuration and audio data PDUs can be mixed, so that configuration PDUs are interleaved with audio PDUs, thereby enabling the dynamic re-configuration of assistive-listening device 200 and/or electronic device 100. In some embodiments, the interleaved PDUs can contain information (e.g., sequence number bits, etc.) in header 402 that indicates that the PDUs are related to the processing of audio.

The process shown in FIG. 11 starts when an application being executed by electronic device 200 or a circuit in electronic device 200 generates an analog audio signal to be sent to assistive-listening device 300 using the BTLE network connection (step 1100). Electronic device 200 then determines the audio processing that is to be performed on the analog audio signal to generate a digital output that is to be sent to assistive-listening device 300 (step 1102). As described above, this operation can involve determining which audio decoder, audio converter, amplifier, equalizer, and/or other type of audio processing are provided by assistive-listening device 300, as indicated by one or more configuration settings in electronic device 200.

Upon determining the audio processing that is to be performed on the analog audio signal, electronic device 200 performs the audio processing to generate the digital output (step 1104). Electronic device 200 then assembles a data channel PDU 500 with a payload 504 that contains the digital output (step 1106), and sets a value in a header 502 of the data channel PDU 500 to indicate that the payload 504 contains audio data (step 1108). In the described embodiments, the audio processing and the assembly of the data channel PDU 500 can occur in different applications, layers of the protocol stack, etc. For example, in some embodiments, encoded audio data coming from a codec in electronic device 100 is treated as a stream and directly fed to the link layer (LL) of the Bluetooth protocol stack in electronic device 100. The link layer (LL) can treat the stream as a real time stream (e.g., may flush data from this stream in case of link congestion, etc.).

Next, the electronic device 200 transmits the data channel PDU to the assistive-listening device 300 using the BTLE network connection (step 1110). Note that the data channel PDU is transmitted from electronic device 200 upon the occurrence of a corresponding event (see FIG. 8), so that electronic device 200 is in a sending window, and is therefore permitted to transmit packets to assistive-listening device 300 using the BTLE network connection, and assistive-listening device 300 is in a receiving window, and is therefore listening for packets from electronic device 200 on the BTLE network connection. In some embodiments, the devices are in the active communication mode and the connection interval is configured accordingly. Additionally, in the described embodiments, electronic device 200 may retransmit the data channel PDU during a subsequent retransmission event, as is described in more detail below.

The process shown in FIG. 12 starts when assistive-listening device 300 receives the data channel PDU 500 transmitted from electronic device 200 using the BTLE network connection (step 1200). In the logical link 704 layer of BTLE protocol stack 700, assistive-listening device 300 determines that the header 502 of the data channel PDU 500 indicates that the payload 504 of the data channel PDU 500 contains audio data (step 1202). For example, the logical link 704 layer can read the header of the packet to determine if a predetermined field in the header 502 of the data channel PDU 500 indicates that the payload 504 contains audio data. In some embodiments, this can comprise reading the LLID to determine if the LLID is set to a predetermined value, e.g., 00.

Upon determining that the data channel PDU 500 contains audio data, the logical link 704 layer forwards the audio data from the payload 504 to an audio 712 layer of the BTLE protocol stack (step 1204). Note that, in some embodiments, the entire payload 504 of the data channel PDU 500 is forwarded from the logical link 704 layer to the audio 712 layer. Audio 712 layer then sends the audio data to the appropriate part of an audio subsystem 308 for processing (step 1206). In audio subsystem 308, one or more operations are performed on the audio data from the payload 504 to generate processed digital audio data (step 1208). For example, the audio data from payload 504 can be decoded, transcoded, equalized, normalized, modified, and/or otherwise processed. The processed digital audio data is then forwarded to a DAC 802 to be converted to an analog signal (step 1210). From DAC 802, the analog signal is then sent to transducer to be used to generate an output signal that can be perceived as sound (step 1212).

Additionally, in the described embodiments, assistive-listening device 300 may receive the data channel PDU 500 during a retransmission event. In these embodiments, upon receiving the data channel PDU 500 during the retransmission event, assistive-listening device 300 processes the data channel PDU 500 as described above.

Although we describe the processes in FIGS. 11-12 using electronic device 200 as the sending device and assistive-listening device 300 as the receiving device, in alternative embodiments, other combinations of devices can be used. For example, in some embodiments, two electronic devices 200 can perform the operations shown in FIGS. 11-12.

Retransmission of Data

The described embodiments use modified BTLE event-based communication scheme that enables electronic device 200 and assistive-listening device 300 to avoid some of the effects of interference or data loss/corruption when communicating with one another. Specifically, in the described embodiments, the event-based communication scheme of BTLE is modified by adding "retransmission events" during which a transmitting device automatically retransmits data. In these embodiments, when retransmitting the data during a retransmission event, the transmitting device retransmits the data at a different frequency than the frequency at which the data was originally transmitted during a corresponding regular event. A receiving device can determine if data was successfully received during a regular event and, if so, can ignore the retransmission of the data during the corresponding retransmission event. In this way, the receiving device has the opportunity to receive (or re-receive) the data, but the receiving device is not obligated to listen for the retransmitted data.

For clarity in the following description, we use electronic device 200 as a transmitting device and assistive-listening device 300 as a receiving device. However, in alternative embodiments, other combinations of devices are used. Generally, any set of devices that can communicate using the BTLE standard can be configured to use the event-based scheme with retransmission events herein described. For example, two electronic devices 200 can communicate with one another. In addition, in some embodiments, three or more devices may be configured to communicate with one another using similar techniques.

Figure 13:
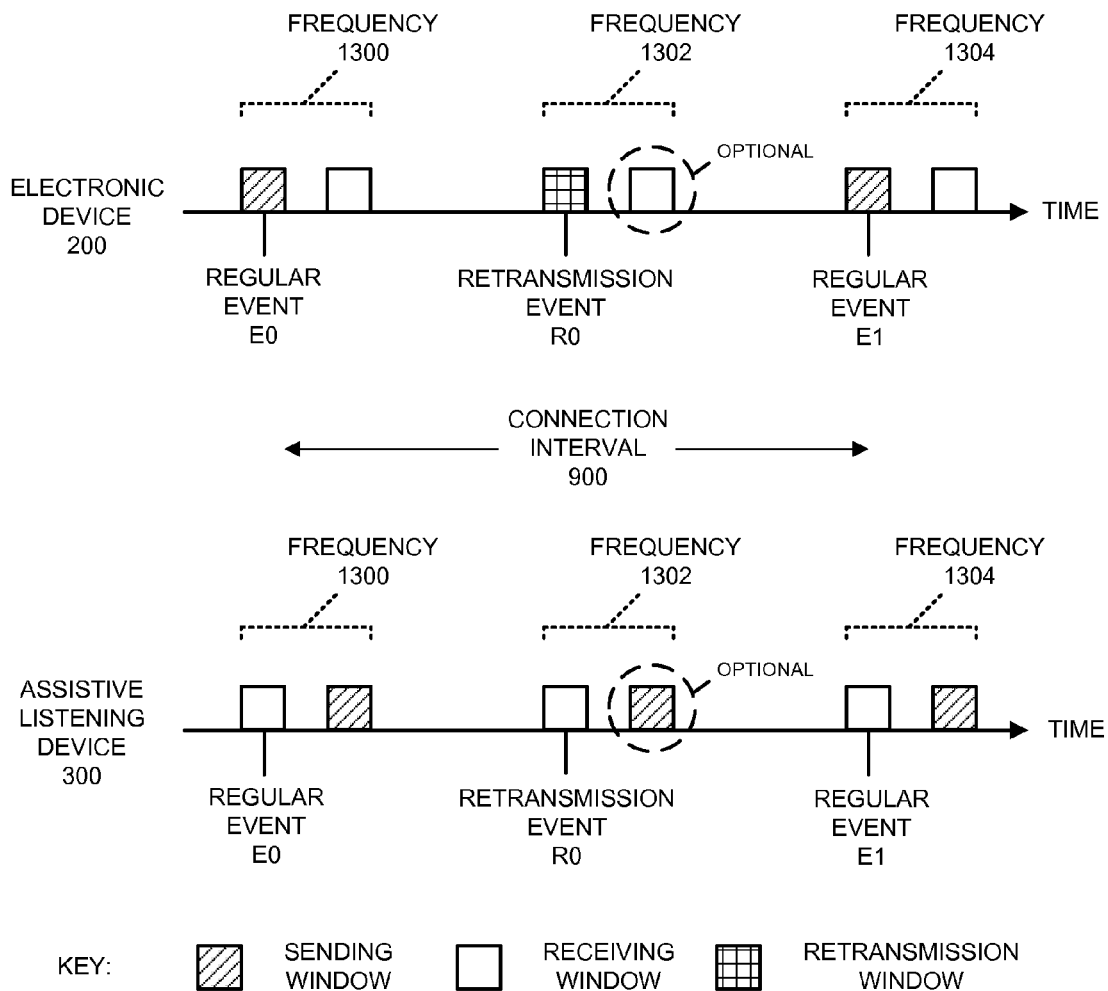
FIG. 13 presents a timeline diagram illustrating an event-based communication scheme with retransmission events in accordance with the described embodiments.

FIG. 13 presents a timeline diagram illustrating an event-based communication scheme in accordance with the described embodiments. FIG. 13 includes two timelines, one for electronic device 200 and the other for assistive listening device 300, along with a key describing the different "windows" shown in FIG. 13. As can be seen in FIG. 13, the event-based scheme in the described embodiments comprises two different types of events: "regular" events and "retransmission" events. The regular events shown in FIG. 13 include regular events E0 and E1, and the retransmission events include retransmission event R0. In some embodiments, the regular events are similar to the "events" shown in FIG. 1. However, the retransmission events shown in FIG. 13 are not implemented in the existing BTLE standard.

During a regular event, a PDU comprising data "D" is sent from electronic device 200 to assistive-listening device 300 (assuming that data D was available to be sent). More specifically, in electronic device 200's sending window during the regular event, electronic device 200 sends the PDU to assistive-listening device 300, which is in a corresponding receiving window and is therefore listening for data from electronic device 200. The data D sent in the PDU can generally be any type of data, e.g., the above-described audio data.

Additionally, during a regular event, a corresponding frequency is used to communicate between electronic device 200 and assistive-listening device 300. More specifically, the Bluetooth interfaces (e.g., the radios, etc.) in electronic device 200 and assistive-listening device 300 are configured during the regular event to transmit and receive at the corresponding frequency. For example, for regular event E0 frequency 1300 is used and for regular event E1 frequency 1304 is used. In some embodiments, frequency 1300 is different than frequency 1304. Generally, the frequencies used can be any frequency at which a radio is permitted to operate according to the limitations of the underlying interfaces. In some embodiments, the frequencies are further limited to frequencies allowable in accordance with the BTLE standard and other external standards and rules dictating operating frequencies for electronic devices, as are known in the art.

During a retransmission event, a PDU comprising data D is resent from electronic device 200 to assistive-listening device 300. More specifically, in electronic device 200's retransmission window during the retransmission event, electronic device 200 sends the PDU to assistive-listening device 300, which is in a corresponding receiving window and is therefore listening for data from electronic device 200. The data D sent in the PDU during the retransmission event is the same data that was originally sent during a corresponding regular event. For example, for retransmission event R0, the data D is the same as was sent during corresponding regular event E0. As described above, resending the data during the retransmission event provides assistive-listening device 300 with an opportunity to receive or re-receive data that was not properly received during the corresponding regular event.

Additionally, during a retransmission event, a corresponding frequency is used to communicate between electronic device 200 and assistive-listening device 300. More specifically, the Bluetooth interfaces (e.g., the radios, etc.) in electronic device 200 and assistive-listening device 300 are configured during the retransmission event to transmit and receive at the corresponding frequency. For example, for retransmission event R0, frequency 1302 is used. In the described embodiments, the frequency used during a retransmission event is different than the frequency used during the corresponding regular event. For example, frequency 1302 for retransmission event R0 is different than frequency 1300 for corresponding regular event E0. As with regular events, the frequencies used during retransmission events can be any frequency at which a radio is permitted to operate according to the limitations of the underlying interfaces and/or the frequencies allowable in accordance with the BTLE standard and other external standards and rules dictating operating frequencies for electronic devices.

In the described embodiments, the regular events occur at a given connection interval 900, and retransmission events are configured to occur between regular events. Thus, a given regular event occurs at a time $T_0$ and the corresponding retransmission event occurs at a time $T_0+N$, which is between the regular event and a next regular event. For example, connection interval 900 can be 15 ms, and retransmission events can occur 7.5 ms after the corresponding regular event starts (i.e., mid-way between the regular events). Generally, any timing can be used for retransmission events with respect to regular events in accordance with the abilities of the Bluetooth interfaces in electronic device 200 and assistive-listening device 300 and the general timing limits (e.g., minimum time between events, etc.) for communications in the BTLE standard. In addition, as with connection interval 900, in some embodiments, the time between a regular event and a corresponding retransmission event can be dynamically configured by electronic device 200 and/or assistive-listening device 300.

In the described embodiments, a PDU comprising data D can be resent by electronic device 200 during the retransmission event automatically. For example, electronic device 200 can resend the PDU comprising data D without receiving a request from assistive-listening device 300. In this way, assistive-listening device 300 can be assured that a PDU sent from electronic device 200 during a regular event will then be resent during a corresponding retransmission event, without a request message or other signal from assistive-listening device 300.

In alternative embodiments, assistive-listening device 300 can send one or more messages to cause or prevent electronic device 200 from resending data during a retransmission event. For example, in some embodiments, assistive-listening device 300 can send an acknowledge message to acknowledge the successful receipt of data during a regular event, which causes electronic device 200 not to resend the data during the corresponding retransmission event.

In the described embodiments, if a PDU (and the data within the PDU) is successfully received during a regular event, assistive-listening device 300 can ignore the resending of the data from electronic device 200 during the corresponding retransmission event. More specifically, in its receiving window during a regular event, assistive-listening device 300 can receive a PDU with data D transmitted from electronic device 200. Assistive-listening device 300 can then examine the data D to determine if the data was received in a correct condition. For example, in some embodiments, assistive-listening device 300 can compute a cyclic redundancy check (CRC) value for the PDU/data D and compare the CRC value to a CRC value included in the PDU to ensure that the values match and hence data D arrived correctly. When data D was received correctly, assistive-listening device 300 has no need for re-receiving the data, and hence assistive-listening device 300 can ignore the resending of the data from electronic device 200 during the corresponding retransmission event.

When "ignoring" the resending of the data from electronic device 200 during the corresponding retransmission event, the second device may place portions of certain subsystems (e.g., radios or other Bluetooth interface mechanisms) in a low-power mode immediately following the regular event in which data D was received successfully. This can help assistive-listening device 300 to avoid unnecessarily consuming power, and can therefore help assistive-listening device 300 preserve battery life.

In FIG. 13, a sending window is shown for assistive-listening device 300 and a receiving window is shown for electronic device 200 during retransmission event R0. However, the sending window for assistive-listening device 300 and the receiving window for electronic device 200 during the retransmission event are optional. These windows are optional because in some embodiments, no PDUs are transmitted from assistive-listening device 300 during a retransmission event. Thus, in some embodiments, a sending window is not used by assistive-listening device 300 during the retransmission event. However, in alternative embodiments, one or more messages may be transmitted from assistive-listening device 300 to electronic device 200 during the retransmission event. For example, an acknowledge or negative acknowledge message may be transmitted to electronic device 200 to ensure that electronic device 200 receives an indication that assistive-listening device 300 successfully received the data D (or did not).

In the described embodiments, if the data D is not successfully received during either the regular event or a retransmission event, the data may be again resent during a subsequent regular event. In some embodiments, the data is resent in the subsequent regular event using either the frequency of the retransmission event or the frequency of the prior regular event.

In some embodiments, because electronic device 200 is configured to automatically resend data during a retransmission window, assistive-listening device 300 need not acknowledge the receipt of data during the corresponding regular window. Because no acknowledge message need be sent, assistive-listening device 300 can power-down radios during a regular event without performing any transmit operations during the sending window for assistive-listening device 300 when there is no other data to be sent. In other words, as soon as data is successfully received in a receiving window during a regular event in assistive-listening device 300, if there is no other data to be transmitted to electronic device 200, assistive-listening device 300 can power down the radios in the Bluetooth interface.

Figure 14:
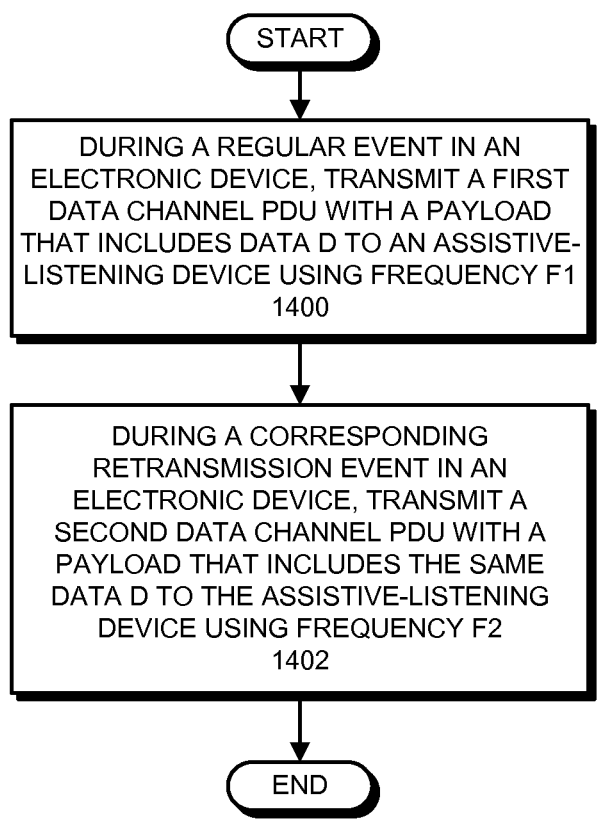
FIG. 14 presents a flowchart illustrating a process for communicating between an electronic device and an assistive-listening device using an event-based scheme with retransmission events in accordance with the described embodiments.

FIG. 14 presents a flowchart illustrating a process for communicating between electronic device 200 and assistive-listening device 300 using an event-based scheme with retransmission events in accordance with the described embodiments. Generally, the process shown in FIG. 14 occurs after electronic device 200 and assistive-listening device 300 have initialized a BTLE network connection using operations known in the art. Note that initializing the BTLE network connection in the described embodiments comprises configuring a connection interval 900 (i.e., the timing of regular events), as well as the timing of retransmission events.

The process shown in FIG. 14 starts when electronic device 200, during a regular event (and in electronic device 200's sending window), transmits a first data channel PDU with a payload 504 that includes data D to assistive-listening device 300 using frequency $F_1$ (step 1400). As described above, the regular event is scheduled and the frequency is decided upon by electronic device 200 and assistive-listening device 300 as part of the initialization of the BTLE network connection. Additionally, "using" frequency $F_1$ comprises configuring one or more mechanisms (radios, etc.) in the Bluetooth interface in electronic device 200 to use frequency $F_1$ when transmitting the first data channel PDU.

Electronic device 200 then, during a corresponding retransmission event (and in electronic device 200's retransmission window), transmits a second data channel PDU with a payload that includes the same data D to assistive-listening device 300 using frequency $F_2$ (step 1402). As described above, in some embodiments, the retransmission of the data occurs automatically, without receiving a request message from assistive-listening device 300 at electronic device 200. In addition, in the described embodiments, frequency $F_2$ is different than frequency $F_1$. (Although not shown in FIG. 14, electronic device 200 then proceeds to the next regular event.)

Figure 15:
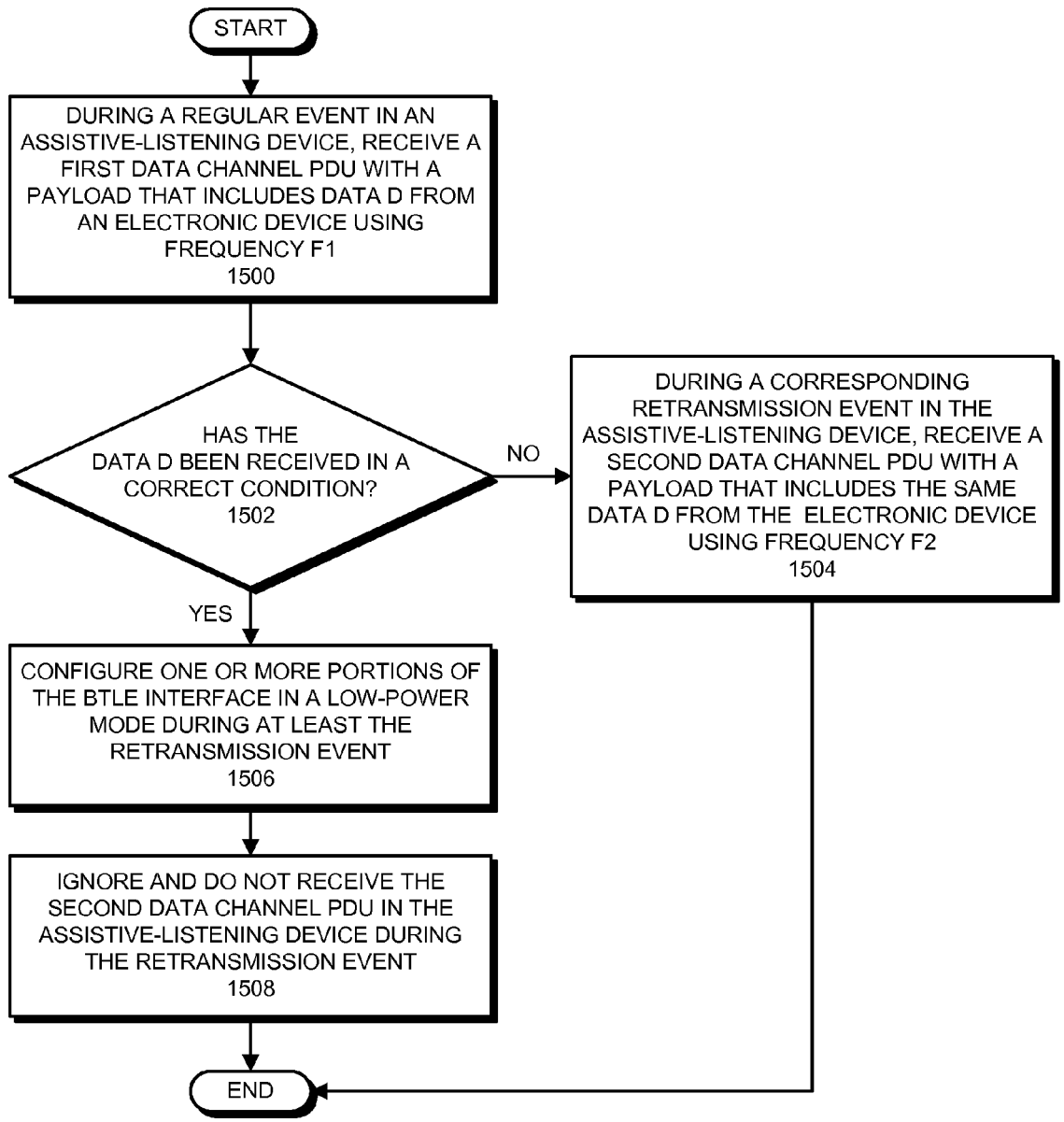
FIG. 15 presents a flowchart illustrating a process for communicating between an electronic device and an assistive-listening device using an event-based scheme with retransmission events in accordance with the described embodiments.

FIG. 15 presents a flowchart illustrating a process for communicating between electronic device 200 and assistive-listening device 300 using an event-based scheme with retransmission events in accordance with the described embodiments. Generally, the process shown in FIG. 15 occurs after electronic device 200 and assistive-listening device 300 have initialized a BTLE network connection using operations known in the art. Note that initializing the BTLE network connection in the described embodiments comprises configuring a connection interval 900 (i.e., the timing of regular events), as well as the timing of retransmission events.

The process shown in FIG. 15 starts when assistive-listening device 300, during a regular event (and in assistive-listening device 300's receiving window), receives a first data channel PDU with a payload 504 that includes data D from electronic device 200 using frequency $F_1$ (step 1500). As described above, the regular event is scheduled and the frequency is decided upon by electronic device 200 and assistive-listening device 300 as part of the initialization of the BTLE network connection. Additionally, "using" frequency $F_1$ comprises configuring one or more mechanisms (radios, etc.) in the Bluetooth interface in assistive-listening device 300 to use frequency $F_1$ when receiving the first data channel PDU.

Assistive-listening device 300 next determines whether the data D in the payload of the first data channel PDU has been received in a correct condition (step 1502). More specifically, assistive-listening device 300 can perform one or more operations to check if the data D transmitted by electronic device 200 in the payload of the first data channel PDU matches the data D received by assistive-listening device 300 in the payload of the first data channel PDU. In some embodiments, this means computing a cyclic redundancy check (CRC) value for the first data channel PDU, and comparing the computed CRC value with an CRC value in a field in the first data channel PDU to determine if the data matches. Mismatches in the data D can be due to a number of different influences; however one common influence is interference at the transmission frequency $F_1$ that corrupts the first data channel PDU as it is wirelessly transmitted from electronic device 200 to assistive-listening device 300.

If assistive-listening device 300 did not receive data D in the correct condition during the regular event, assistive-listening device 300, during a corresponding retransmission event (and in assistive-listening device 300's receiving window), receives a second data channel PDU with a payload 504 that includes the same data D from electronic device 200 using frequency $F_2$ (step 1504). As described above, in some embodiments, the retransmission of the data from electronic device 200 occurs automatically, without receiving a request message from assistive-listening device 300 at electronic device 200. Thus, in these embodiments, electronic device 200 can always transmit the second data channel PDU with the same data, and assistive-listening device 300 can simply receive the data when it has a reason to do so. Also, as described above, frequency $F_2$ is different than frequency $F_1$.

In some embodiments, assistive-listening device 300 sends a third data channel PDU to acknowledge the correct receipt of the data D during either the regular event or the retransmission event. This can comprise sending the third data channel PDU during a sending window for assistive-listening device 300 during either the regular event or the retransmission event. However, in some embodiments assistive-listening device 300 does not send the third data channel PDU with the acknowledgement message.

If assistive-listening device 300 received data D in the payload of the first data channel PDU in the correct condition during the regular event, assistive-listening device 300 has the data D, and hence does not need to receive the second data channel PDU with data D that is transmitted by electronic device 200 during a corresponding retransmission event. Thus, assistive-listening device 300 can configure one or more portions of the BTLE interface in a low-power mode during at least the retransmission event (step 1506). In the low-power mode, the second data channel PDU transmitted from the electronic device 200 during the retransmission event is ignored and not received in the assistive-listening device 300 (step 1508). Note that although we describe an embodiment where one or more portions of the BTLE interface are configured in a low-power mode during at least the retransmission event, alternative embodiments leave the BTLE interface in a full power operating state, but otherwise ignore and/or do not receive the second data channel PDU transmitted from the electronic device 200 during the retransmission event.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments.

What is claimed is:

1. A method for communicating between electronic devices, comprising:
    in a transmitting electronic device,
    transmitting a first data channel protocol data unit (PDU) to a receiving electronic device using a short-range wireless communication interface in a sending window for the transmitting electronic device during a regular event during a connection interval, wherein the first data channel PDU comprises a payload with data D, and wherein the transmitting the first data channel PDU during the regular event comprises using a first frequency to transmit the first data channel PDU; and
    transmitting a second data channel PDU to the receiving electronic device using the short-range wireless communication interface in a sending window for the transmitting electronic device during a retransmission event during the connection interval, wherein the second data channel PDU comprises a payload with the data D, and wherein the transmitting the second data channel PDU during the retransmission event comprises using a second frequency different from the first frequency to transmit the second data channel PDU and transmitting the second data channel PDU independent from whether the receiving electronic device listens for the second data channel PDU.

2. The method of claim 1, further comprising:
    receiving a message from the receiving electronic device that indicates that the first data channel PDU or the second data channel PDU was received successfully in a receiving window for the transmitting electronic device during the regular event or the retransmission event.

3. The method of claim 1, wherein the data D comprises audio data.

4. The method of claim 1, wherein the receiving electronic device comprises an assistive-listening device.

5. The method of claim 1, further comprising:
    prior to transmitting the first data channel PDU and second data channel PDU during the regular event and the retransmission event, respectively, communicating with the receiving electronic device to configure a schedule of times at which the regular event and the retransmission events occur.

6. The method of claim 1, further comprising:
    receiving a message from the receiving electronic device that indicates that the first data channel PDU was received successfully during the regular event; and
    responsive to receiving the message that indicates that the first data channel PDU was received successfully during the regular event, preventing the transmitting of the second data channel PDU to the receiving electronic device during the retransmission event.

7. The method of claim 1, further comprising:
    failing to receive a message from the receiving electronic device that indicates that either of the first data channel PDU or the second data channel PDU was received successfully; and
    in response to failing to receive the message from the receiving electronic device, transmitting a third data channel PDU to the receiving electronic device using the short-range wireless communication interface in a sending window for the transmitting electronic device during a next regular event.

8. The method of claim 1, wherein the transmitting electronic device transmits the first data channel PDU and the second data channel PDU without receiving a message from the receiving electronic device that indicates that the first data channel PDU or the second data channel PDU was received successfully.

9. The method of claim 1, wherein each of the first data channel PDU and the second data channel PDU comprises a link-layer ID field in a corresponding header.

10. The method of claim 9, wherein the link-layer ID field is set to indicate whether the corresponding PDU comprises audio data.

11. The method of claim 1, wherein the transmitting the second data channel PDU during the retransmission event comprises automatically transmitting the second data channel PDU without receiving a request from the receiving electronic device to transmit the second data channel PDU.

12. An electronic device, comprising:
a processing subsystem, wherein the processing subsystem is configured to:
transmit a first data channel protocol data unit (PDU) to a receiving electronic device using a short-range wireless communication interface in a sending window for a transmitting electronic device, wherein the first data channel PDU comprises a payload with data D, and wherein the transmitting electronic device uses a first frequency to transmit the first data channel PDU; and
transmit a second data channel PDU to the receiving electronic device using the short-range wireless communication interface in a sending window for the transmitting electronic device, wherein the second data channel PDU comprises a payload with the data D, and wherein the transmitting electronic device uses a second frequency to transmit the second data channel PDU and transmits the second data channel PDU independent from whether the receiving electronic device listens for the second data channel PDU, and wherein the first frequency is a different frequency than the second frequency.

13. The electronic device of claim 12, wherein the processing subsystem is further configured to receive a message from the receiving electronic device that indicates that the first and second data channel PDUs were received successfully in a receiving window for the transmitting electronic device.

14. The electronic device of claim 12, wherein the data D comprises audio data.

15. The electronic device of claim 12, wherein the receiving electronic device comprises an assistive-listening device.

16. The electronic device of claim 12, wherein, prior to transmitting the first and second data channel PDUs, the processing subsystem is configured to communicate with the receiving electronic device to configure a schedule of times at which a regular event and a retransmission event occur.

17. The electronic device of claim 12, wherein to transmit the second data channel PDU, the processing subsystem automatically transmits the second data channel PDU without receiving a request from the receiving electronic device to transmit the second data channel PDU.

* * * * *